US012608050B2

(12) United States Patent
Ku et al.

(10) Patent No.: US 12,608,050 B2
(45) Date of Patent: Apr. 21, 2026

(54) DEPLOYABLE FEET AND HINGE GASKETS FOR ELECTRONIC DEVICES

(71) Applicant: Intel Corporation, Santa Clara, CA (US)

(72) Inventors: Jeff Ku, Taipei (TW); Ming-Sheng Tsai, Taipei (TW); Twan Sing Loo, Penang (MY); Jeffrey Ho, New Taipei (TW); Songlin Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 18/329,148

(22) Filed: Jun. 5, 2023

(65) Prior Publication Data

US 2024/0385654 A1 Nov. 21, 2024

(30) Foreign Application Priority Data

May 18, 2023 (WO) ................ PCT/CN2023/095098

(51) Int. Cl.
*G06F 1/16* (2006.01)
*G06F 1/20* (2006.01)

(52) U.S. Cl.
CPC ............ *G06F 1/166* (2013.01); *G06F 1/1616* (2013.01); *G06F 1/1677* (2013.01); *G06F 1/1681* (2013.01); *G06F 1/203* (2013.01); *G06F 2200/20* (2013.01)

(58) Field of Classification Search
CPC ...... G06F 1/166; G06F 1/1616; G06F 1/1677; G06F 1/1681; G06F 1/203; G06F 2200/20; G06F 1/1633
See application file for complete search history.

(56) References Cited

U.S. PATENT DOCUMENTS

| | | | | |
|---|---|---|---|---|
| 6,053,589 A * | 4/2000 | Lin | ........................ | G06F 1/1616 312/271 |
| 6,496,369 B2 * | 12/2002 | Nakamura | ............ | G06F 1/1656 312/236 |
| 6,741,456 B2 * | 5/2004 | Sellers | .................. | G06F 1/1681 16/338 |
| 7,929,292 B2 * | 4/2011 | Li | ........................... | G06F 1/206 361/679.02 |
| 8,014,147 B2 * | 9/2011 | Chen | ..................... | G06F 1/1684 200/61.7 |
| 8,891,231 B2 * | 11/2014 | Okuley | ................. | G06F 1/1616 318/400.26 |
| 8,976,524 B2 * | 3/2015 | Wang | .................... | G06F 1/1656 361/679.48 |
| 9,575,524 B1 * | 2/2017 | Prather | ................. | G06F 1/1662 |

(Continued)

*Primary Examiner* — Zhipeng Wang

(74) *Attorney, Agent, or Firm* — Hanley, Flight & Zimmerman, LLC

(57) ABSTRACT

Systems, apparatus, articles of manufacture, and methods are disclosed for deploying feet and/or including hinge gaskets to improve thermal solutions and/or acoustic experience with electronic devices. An example electronic device includes a first panel; a second panel; a hinge coupling the first panel and the second panel; a foot coupled to the second panel, the foot movable between a deployed position and a retracted position; a sensor to detect a position of the first panel; and programmable circuitry to execute instructions to cause the foot to be moved between the deployed position and the retracted position based on the position of the first panel.

20 Claims, 25 Drawing Sheets

(56)         References Cited

U.S. PATENT DOCUMENTS

| | | | | |
|---|---|---|---|---|
| 10,429,885 | B1 * | 10/2019 | Shaw | G06F 1/166 |
| 10,443,779 | B2 * | 10/2019 | Li | G06F 3/0208 |
| 10,642,309 | B2 * | 5/2020 | Cheng | G06F 1/203 |
| 10,761,571 | B1 * | 9/2020 | Cooper | G06F 1/1681 |
| 11,797,060 | B2 * | 10/2023 | Zhong | G06F 1/203 |
| 2005/0024822 | A1 * | 2/2005 | Janicek | G06F 1/166 |
| | | | | 361/679.46 |
| 2006/0243878 | A1 * | 11/2006 | Saad | G06F 1/203 |
| | | | | 248/346.01 |
| 2008/0062624 | A1 * | 3/2008 | Regen | G06F 1/166 |
| | | | | 361/679.56 |
| 2018/0210504 | A1 * | 7/2018 | Moser | G06F 1/1679 |
| 2021/0096618 | A1 * | 4/2021 | Radhakrishnan | G06F 1/206 |
| 2022/0352732 | A1 * | 11/2022 | Ho | G06F 1/26 |
| 2023/0213968 | A1 * | 7/2023 | Zadvinskis | G06F 1/166 |
| | | | | 361/679.55 |

* cited by examiner

DEPLOYABLE FEET AND HINGE GASKETS FOR ELECTRONIC DEVICES

RELATED APPLICATION

This patent claims priority from International Application No. PCT/CN2023/095098, which was filed on May 18, 2023. International Application No. PCT/CN2023/095098 is hereby incorporated herein by reference in its entirety.

FIELD OF THE DISCLOSURE

This disclosure relates generally to electronic devices and, more particularly, to deployable feet and hinge gaskets for electronic devices.

BACKGROUND

When laptop devices are opened more than 90°, the hinge between the display and the base can redirect fan exhaust back to the base and/or direct fan noise along the display to the user, depending on the position of the hinge.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Thermal solutions for electronic devices such as, for example, laptop computers, are important features used to cool the heat generating components within the electronic devices and enhance the user experience. Electronic devices that become too hot experience performance issues and create an unfavorable user experience. Cooling of the electronic devices also enables greater operating power and improved performance.

Figure 1:
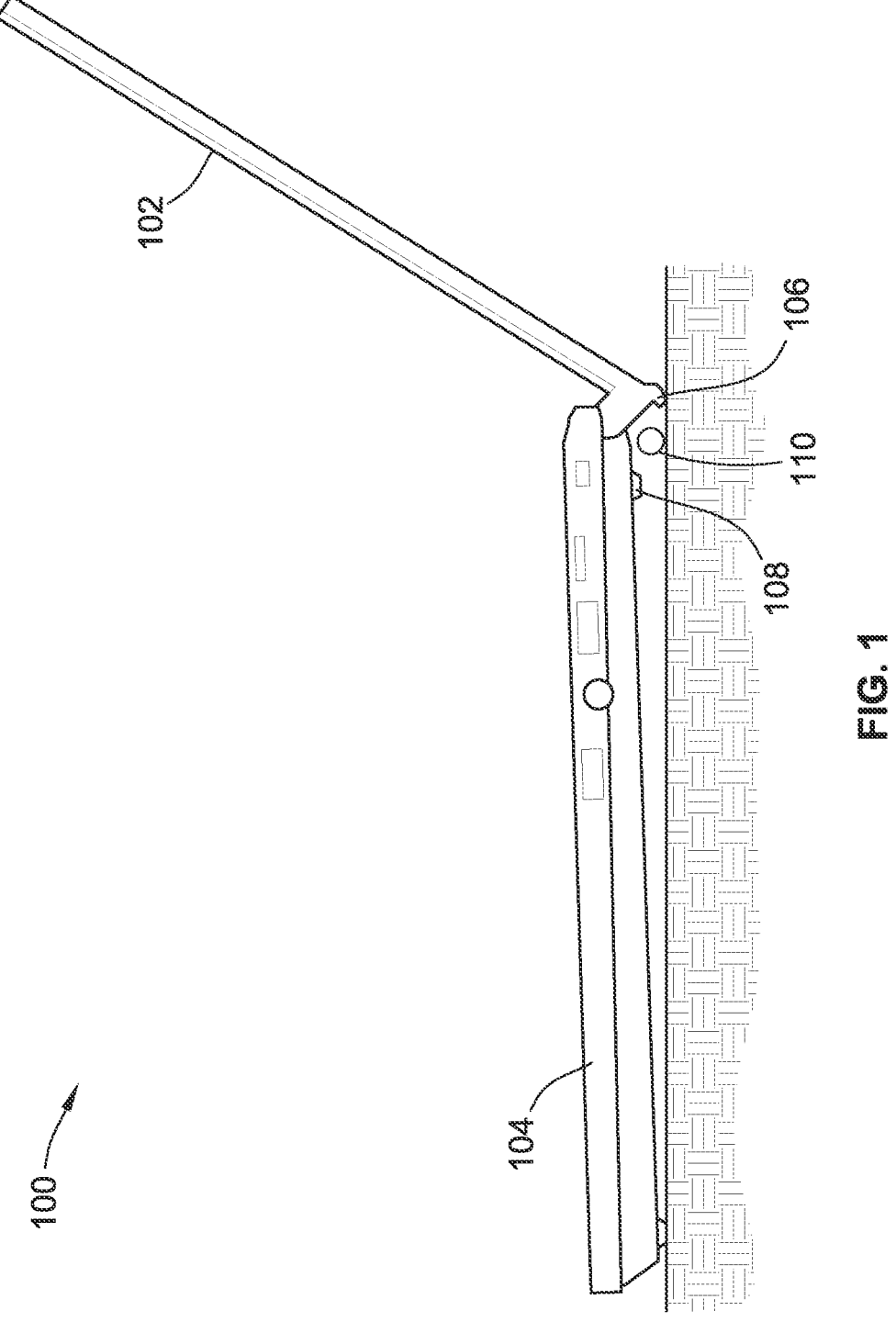
FIG. 1 is a side view of an example electronic device in an open position.

In some electronic devices, the position of the display panel and hinge, when the display panel is opened, cause hot or warm air to be recirculated back into an intake vent of the electronic device. For example, FIG. 1 is a side view of an example electronic device 100 in an open position. The electronic device 100 includes a first panel 102, which is a display panel in this example. The electronic device 100 includes a second panel 104, which is a base panel in this example. The second panel 104 includes heat generating components such as, for example, a central processing unit (CPU), a graphic processing unit (GPU), etc. The first panel 102 and the second panel 104 are coupled by a hinge 106. The electronic device 100 includes a fixed foot 108, which may be, for example, a rubber pad. When the first panel 102 is opened more than 90° relative to the second panel 102, a gap 110 may be formed under the second panel 102 based on the structure of the hinge 106. The example shown in FIG. 1 is a drop hinge, but there may be a gap 110 formed with other types of hinges. Warm or hot air recirculates in the gap 110 and eventually is circulated through intake vents back into the second panel 104. The warm or hot air has less thermal capacity to cool the heat generating components, which compromises the efficiency of the thermal solution for the electronic device 100.

Noise from electronic devices such as, for example, fan noise generated by fans used in the thermal solutions for electronic devices, also affects the user experience. Excessive fan noise may be distracting and/or may muffle audio from media the user wants to consume via the electronic device. Dampening the fan noise enhances the user experience.

Systems, apparatus, articles of manufacture, and methods are disclosed for deploying feet and/or including hinge gaskets to improve thermal solutions and/or acoustic experience with electronic devices.

Figures 2A, 2B, 3A, 3B:
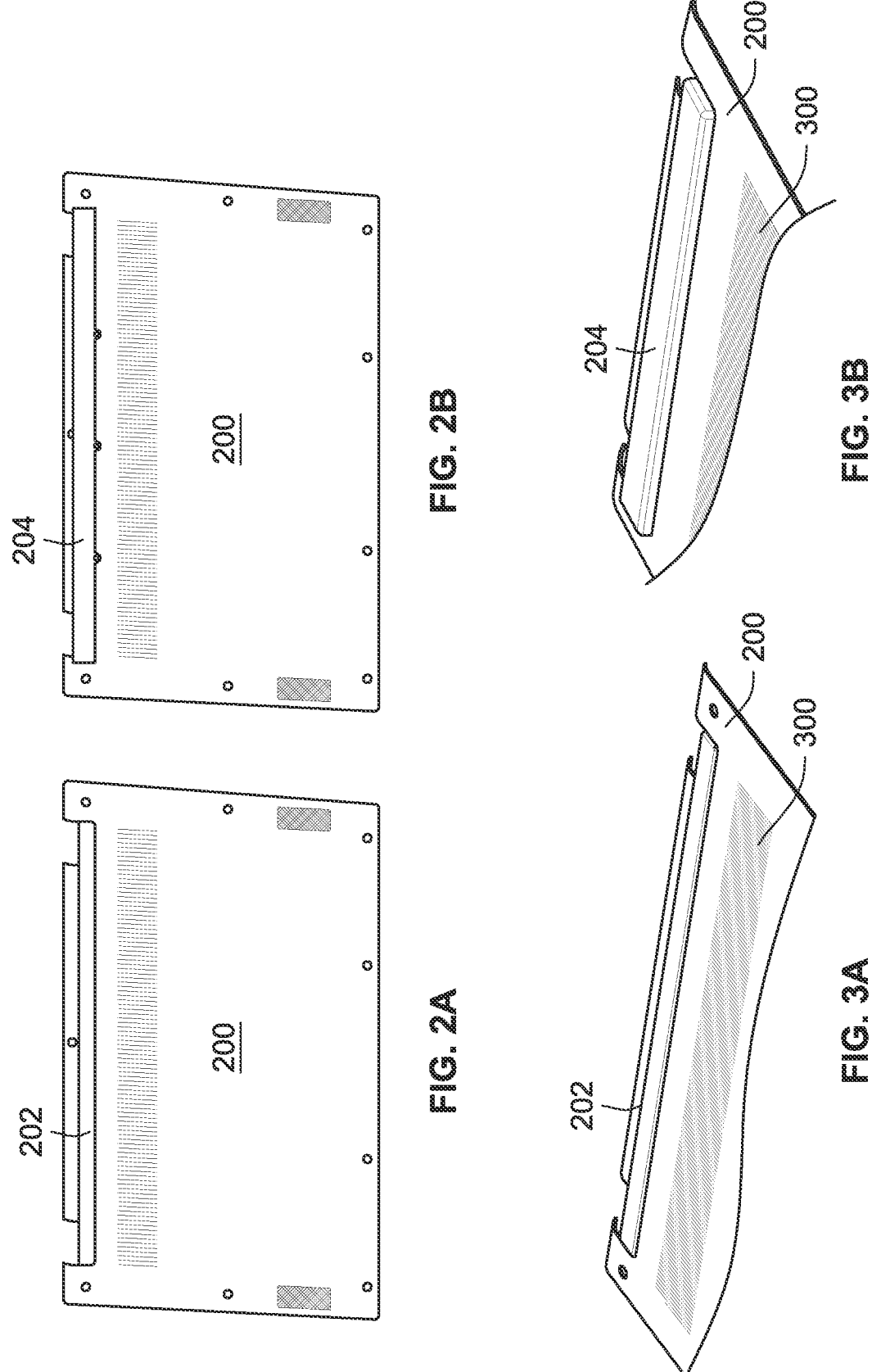
FIG. 2A is a schematic illustration of an exterior of an example D cover of an electronic device with an example deployable foot.
FIG. 2B is a schematic illustration of an interior of the example D cover of FIG. 2A.
FIG. 3A is a schematic illustration of the deployable foot of FIG. 2A in an example retracted position.
FIG. 3B is a schematic illustration of the deployable foot of FIG. 2A in an example deployed position.

FIG. 2A is a schematic illustration of an exterior of an example cover 200 of an example electronic device. The cover 200, in this example, is a D cover. A D cover is the lower cover on a base panel of a laptop computer. Attached to the cover 200 is an example deployable foot 202. In this disclosure, a deployable foot 202 is a support surface that is movable between an extended or deployed position and a compressed or retracted position. In some examples, the deployable foot 202 includes a flexible material. In some examples, the deployable foot 202 includes rubber. In FIG. 2A, one deployable foot 202 is shown. In some examples, there may be two deployable feet at the lateral edges of the cover 200. In some examples, there may be other number of deployable feet such as, for example, three, four, etc. In some examples, there are one or more deployable feet at different positions on the cover 200. In some examples, the cover 200 may include a combination of one or more deployable feet and one or more fixed feet. A fixed foot is not movable and has a fixed position or height.

FIG. 2B is a schematic illustration of an interior of the example D cover of FIG. 2A. The deployable foot 202 is coupled to an example backplate 204, as described in more detail herein.

FIG. 3A is a schematic illustration of the deployable foot 202 of FIG. 2A in an example retracted position. FIG. 3B is a schematic illustration of the deployable foot 202 of FIG. 2A in an example deployed position. In the deployed position, the deployable foot 202 has a height that is greater than the height of the deployable foot 202 in the retracted position. The greater height of the deployable foot in the deployed position, increases the height (e.g., the Z-height) of the electronic device. In some examples, the deployable foot can extend about 1.5 millimeters (mm).

FIG. 3A and FIG. 3B also show example intake vents 300 on the bottom of the cover 200. The intake vents 300 are used to pull ambient air into the electronic device to be circulated by fans within the electronic device to cool heat generating components.

Figure 4A:
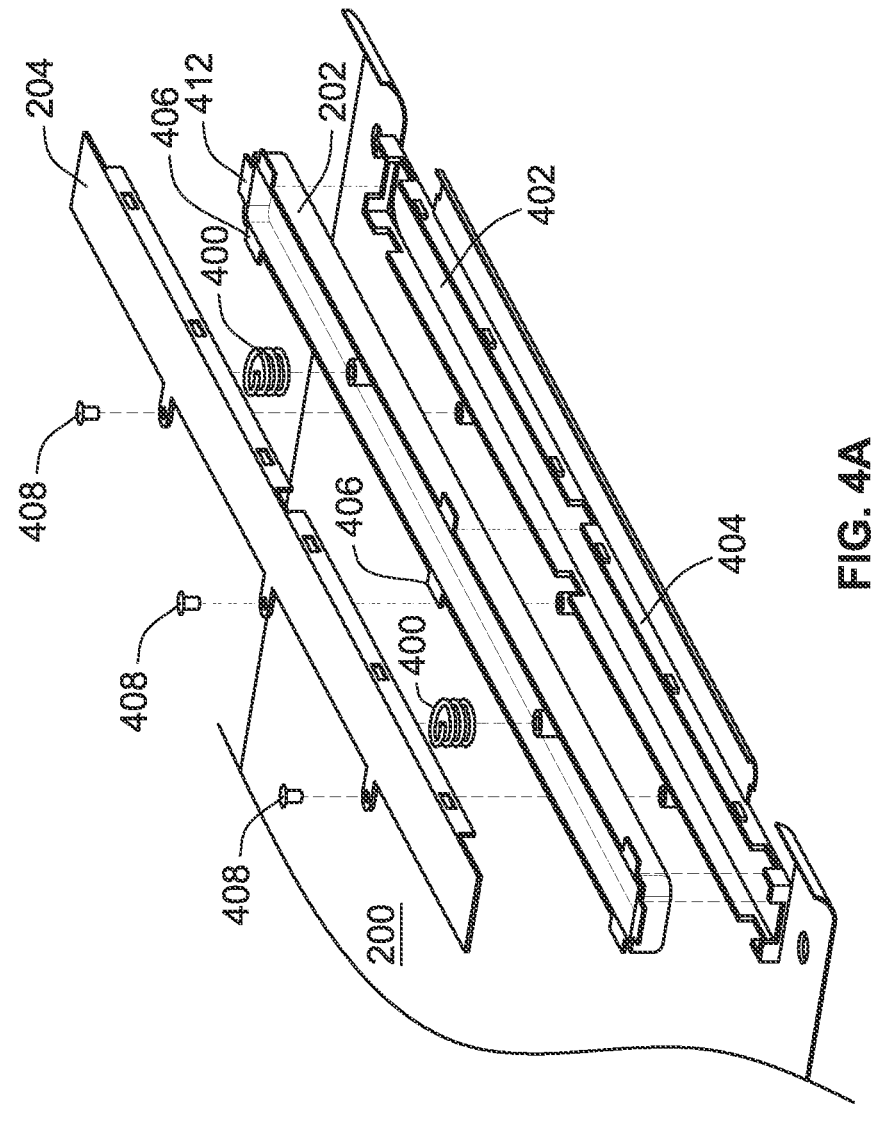
FIG. 4A is a rear perspective exploded view of the deployable foot of FIG. 2A.
Figure 4B:
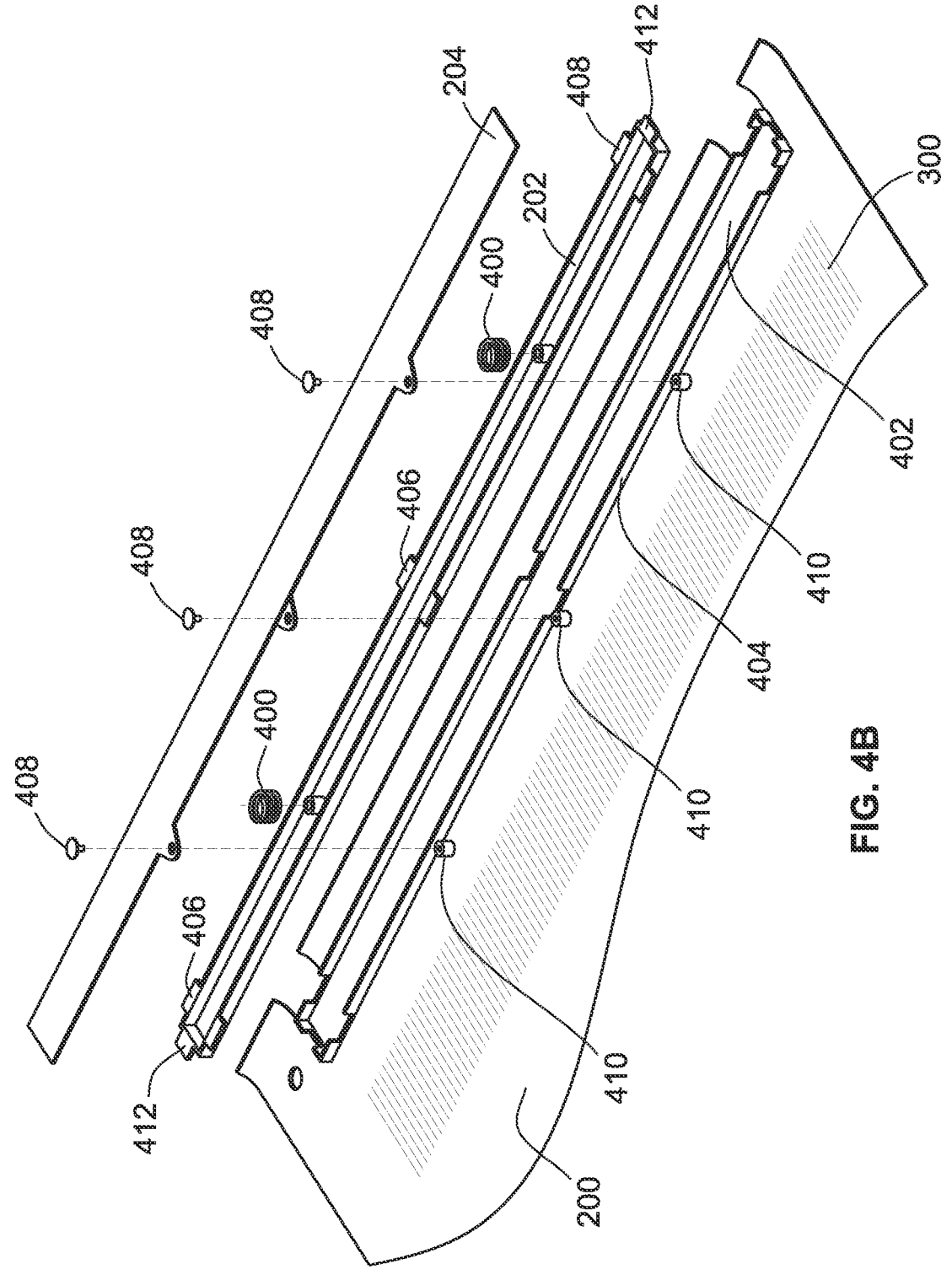
FIG. 4B is a front perspective exploded view of the deployable foot of FIG. 2A.

FIG. 4A is a rear perspective exploded view of the deployable foot 202 of FIG. 2A. FIG. 4B is a front perspective exploded view of the deployable foot 202 of FIG. 2A. One or more example biasing members 400 are coupled between the deployable foot 202 and the backplate 204. In the illustrated example, the biasing members 400 include coil springs. In other example, other biasing members may be used in addition to or alternatively to coil springs including, for example, conical springs, leaf springs, expandable foam, etc. The biasing members 400 are biased to push the deployable foot 202 away from the backplate 204. In some examples, the length and/or elasticity of the biasing members 400 is based on a height of the deployable foot 202 in the deployed position.

The cover 200 includes an example slot 402 through which the deployable foot 202 is movable. The cover 200 includes an example ridge 404 adjacent the slot 402. The deployable foot 202 includes one or more protrusions 406 along its length that engage the ridge 404 to hold an upper portion of the deployable foot 202 in engagement with the ridge 404. The ridge 404 and protrusions 406 hold the deployable foot 202 in the electronic device against the force of the biasing members 400.

A plurality of example fasteners 408 secure the backplate 204 to the cover 200. In the illustrated example, the fasteners 408 include pins, rivets, screws, etc. that fasten into example apertures 410 on the cover 200. In other examples, other suitable mechanical and/or chemical fasteners may be used. Also, in some examples, there may be other numbers of fasteners including, for example, one, two, four, etc.

The deployable foot 202 also includes examples side shoulders or extensions 412. The extensions 412 also secure the deployable foot 202 within the electronic device. As disclosed below, the extensions 412 are used in the deployment and retraction of the deployable foot 202. There are two extensions 412 in the illustrated example. In other examples, there may be one or more extensions 412. In some examples, the number of extensions 412 is based on the dimensions (e.g., length) of the deployable foot 202 and/or the number of deployable feet.

Figure 5:
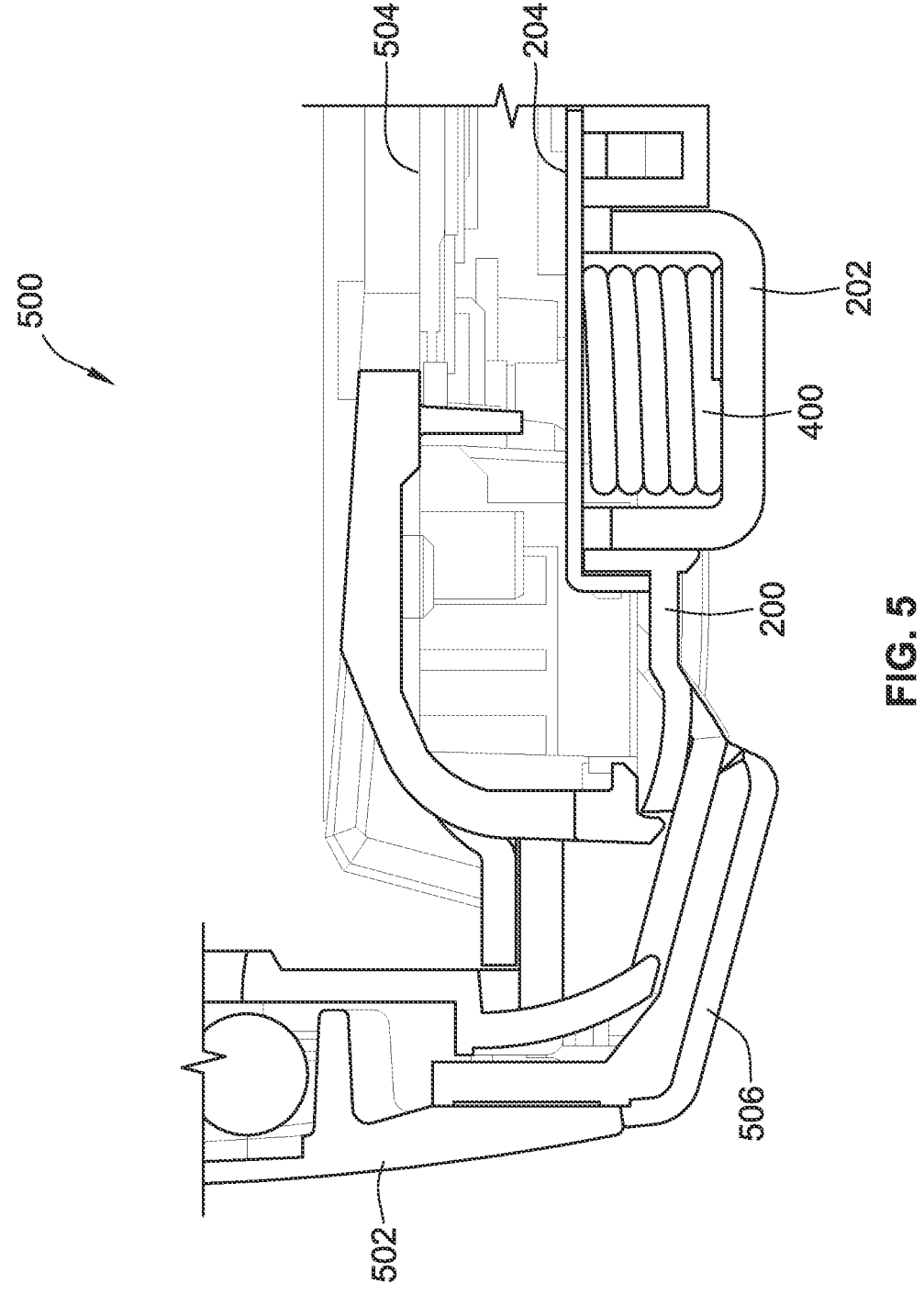
FIG. 5 is a cross-sectional view of a portion of an example electronic device of with the deployable foot of FIG. 2A.

FIG. 5 is a cross-sectional view of a portion of an example electronic device 500 with the deployable foot 202 of FIG. 2A. The electronic device 500 includes a first panel 502, which is a display panel in this example. The electronic device 500 includes a second panel 504, which is a base panel in this example. The second panel 504 includes heat generating components such as, for example, a CPU, GPU, etc. The second panel 504 includes the cover 200 (i.e., the D cover). The first panel 502 and the second panel 504 are coupled by an example hinge 506. In the example of FIG. 5, the deployable foot 202 is in the retracted position. The biasing member 400 is compressed between the deployable foot 202 and the backplate 204.

Figure 6:
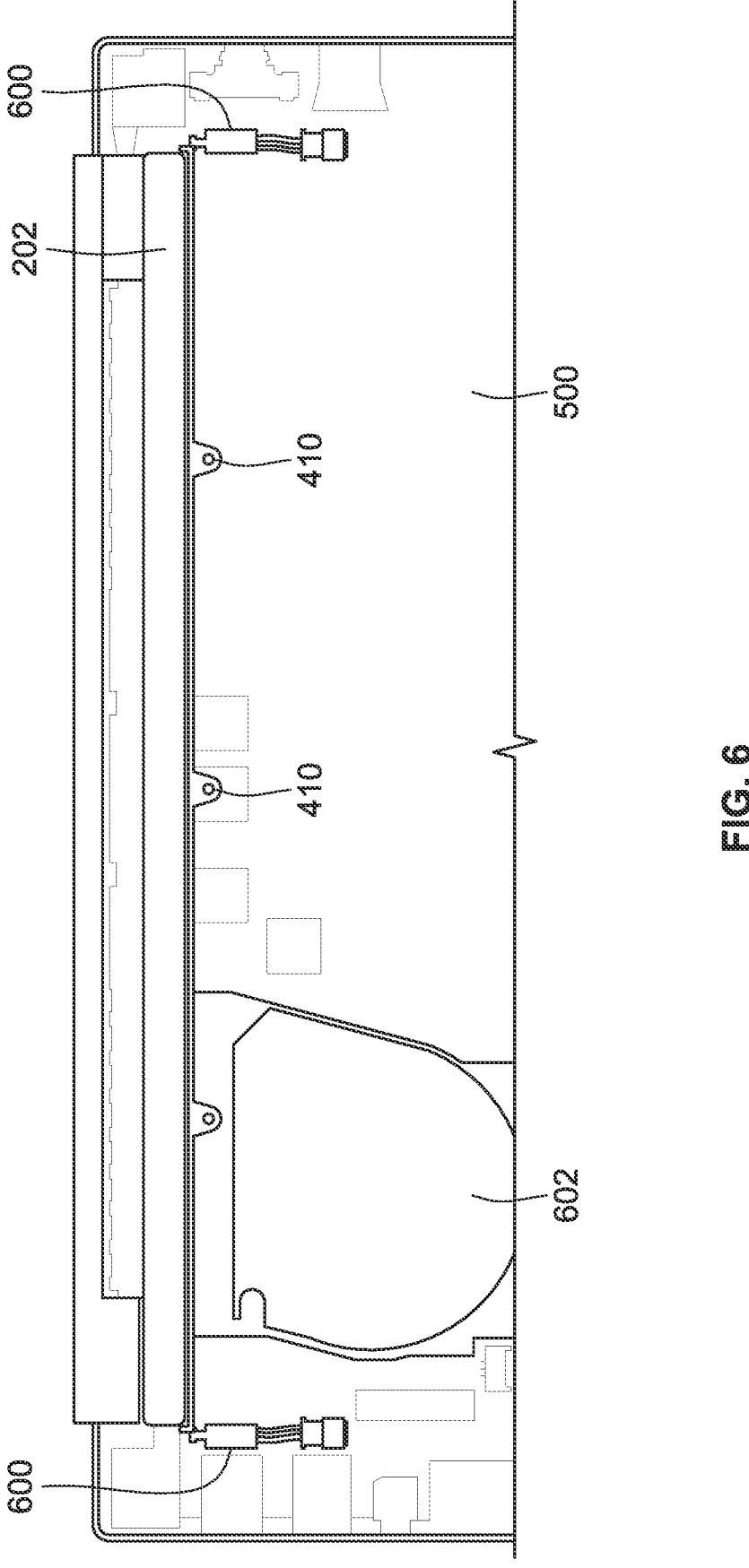
FIG. 6 is a schematic illustration of a portion of an interior of the electronic device of FIG. 5 including a plurality of example motors.

FIG. 6 is a schematic illustration of a portion of an interior of the electronic device 500 of FIG. 5. The electronic device 500 includes a plurality of example actuators 600. In some examples, the actuators are motors such as, for example, a DC motor, a servo motor, an electromagnetic motor, a switch, etc. In the illustrated example, the actuators 600 are laterally displaced and located toward or at the lateral ends of the deployable foot 202. In other examples, there may be only one actuator 600. Also, in other examples, there may be three or more actuators. In some examples, the number of actuators 600 is based on the length of the deployable foot 202.

The electronic device 500 also includes an example fan assembly 602. The fan assembly 602 is part of the thermal solution of the electronic device 500. The fan assembly 602 draws ambient air into the electronic device 500 via, for example, the intake vents 300 (FIG. 3A and FIG. 3B) to push over the heat generating components for cooling of the heat generating components.

Figure 7A:
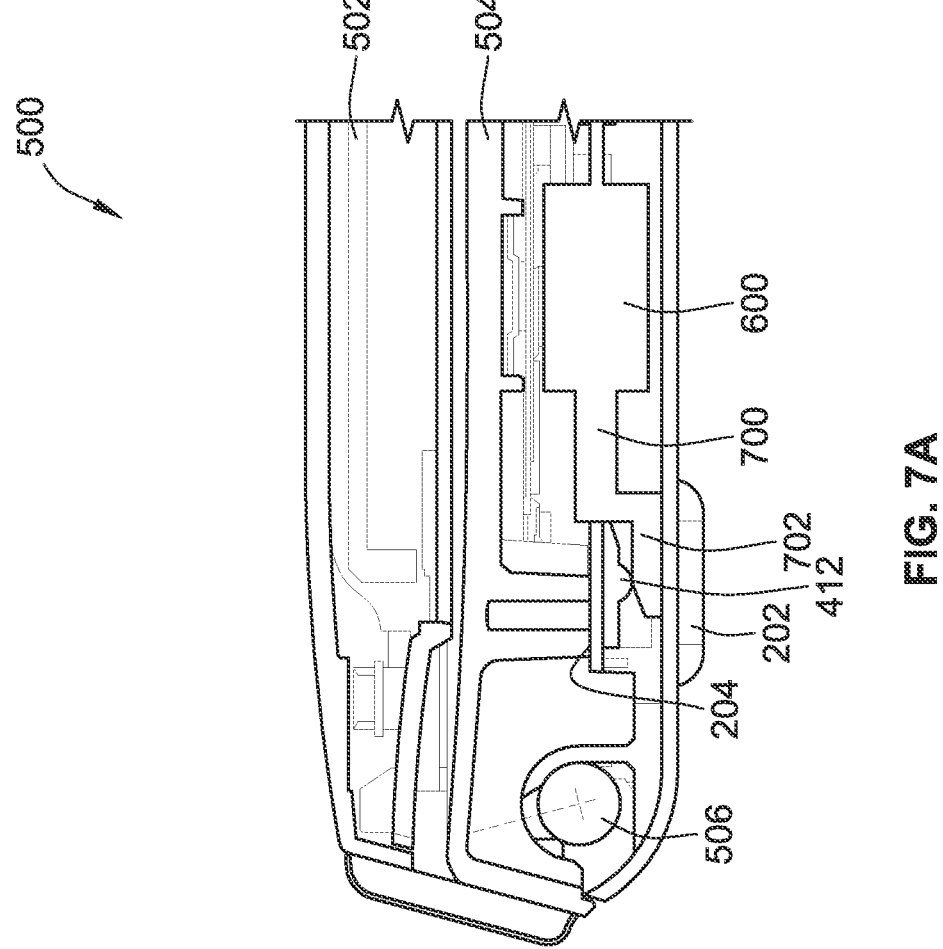
FIG. 7A is a cross-sectional view of a portion of the electronic device of FIG. 5 in a closed position.

FIG. 7A is a cross-sectional view of a portion of the electronic device 500 of FIG. 5 in a closed position. In the closed position, the lid of the electronic device 500 is closed. In other words, in the closed position, the first panel 502 is positioned on the second panel 504. The actuator 600 includes an example push rod 700. The push rod 700 includes an example engagement end 702. The engagement end 702 engages with the extension 412 of the deployable foot 202. When the electronic device 500 is in the closed position, the push rod 700 is extended such that the engagement end 702 maintains the extension 412 in a first position that is near the backplate 204. In this position, the biasing member 400 is compressed, and the deployable foot 202 is in the retracted position.

In examples in which the actuator 600 is a motor, there is no electricity applied to the motor when the electronic device 500 is in the closed position. In this example, when there is no electricity applied to the motor, the push rod 700 is in the extended position.

Figure 7B:
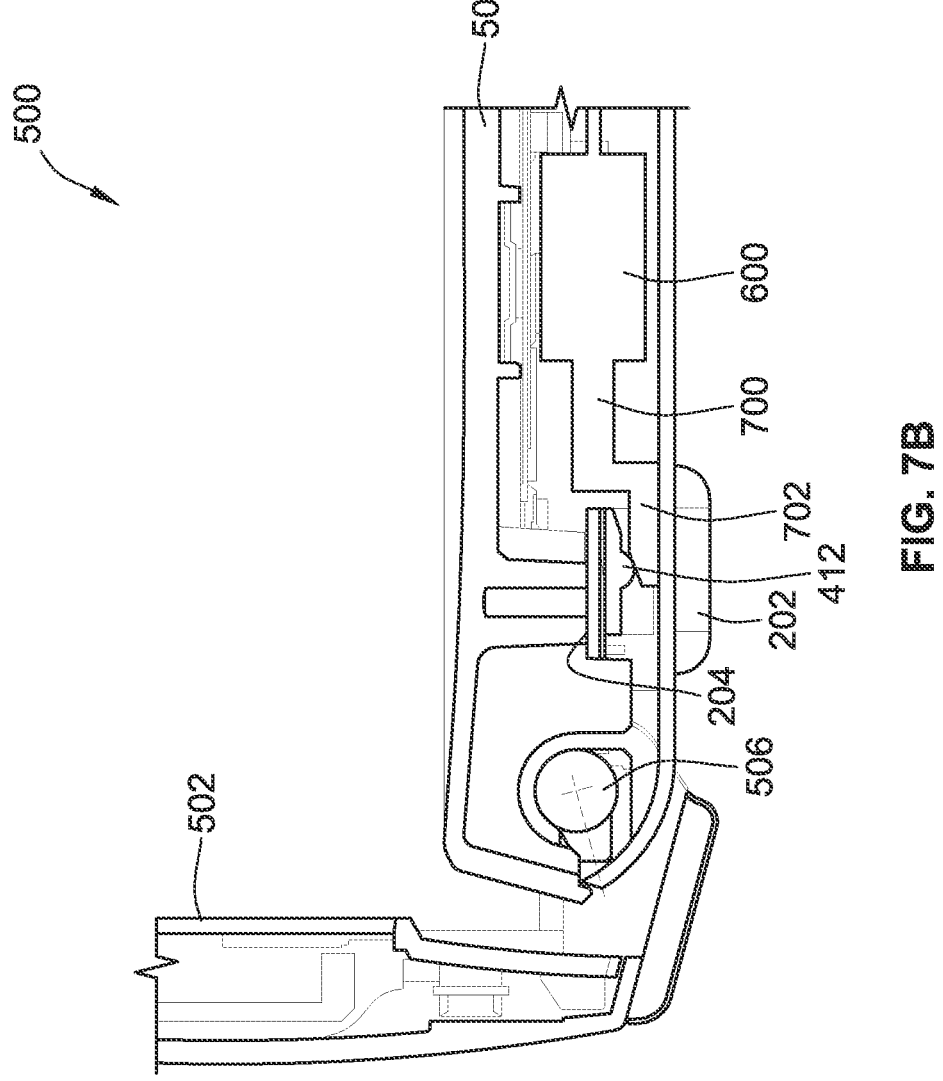
FIG. 7B is a cross-sectional view of a portion of the electronic device of FIG. 5 in a first open position.

FIG. 7B is a cross-sectional view of a portion of the electronic device 500 of FIG. 5 in a first open position. In the first open position, the lid or first panel 502 is opened at or less than 90°. When the electronic device 500 is in the first open position, the push rod 700 is extended such that the engagement end 702 maintains the extension 412 in a first position that is near the backplate 204. In this position, the biasing member 400 is compressed, and the deployable foot 202 is in the retracted position. In examples in which the actuator 600 is a motor, there is no electricity applied to the motor when the electronic device 500 is in the first open position. In this example, when there is no electricity applied to the motor, the push rod 700 is in the extended position.

Figure 7C:
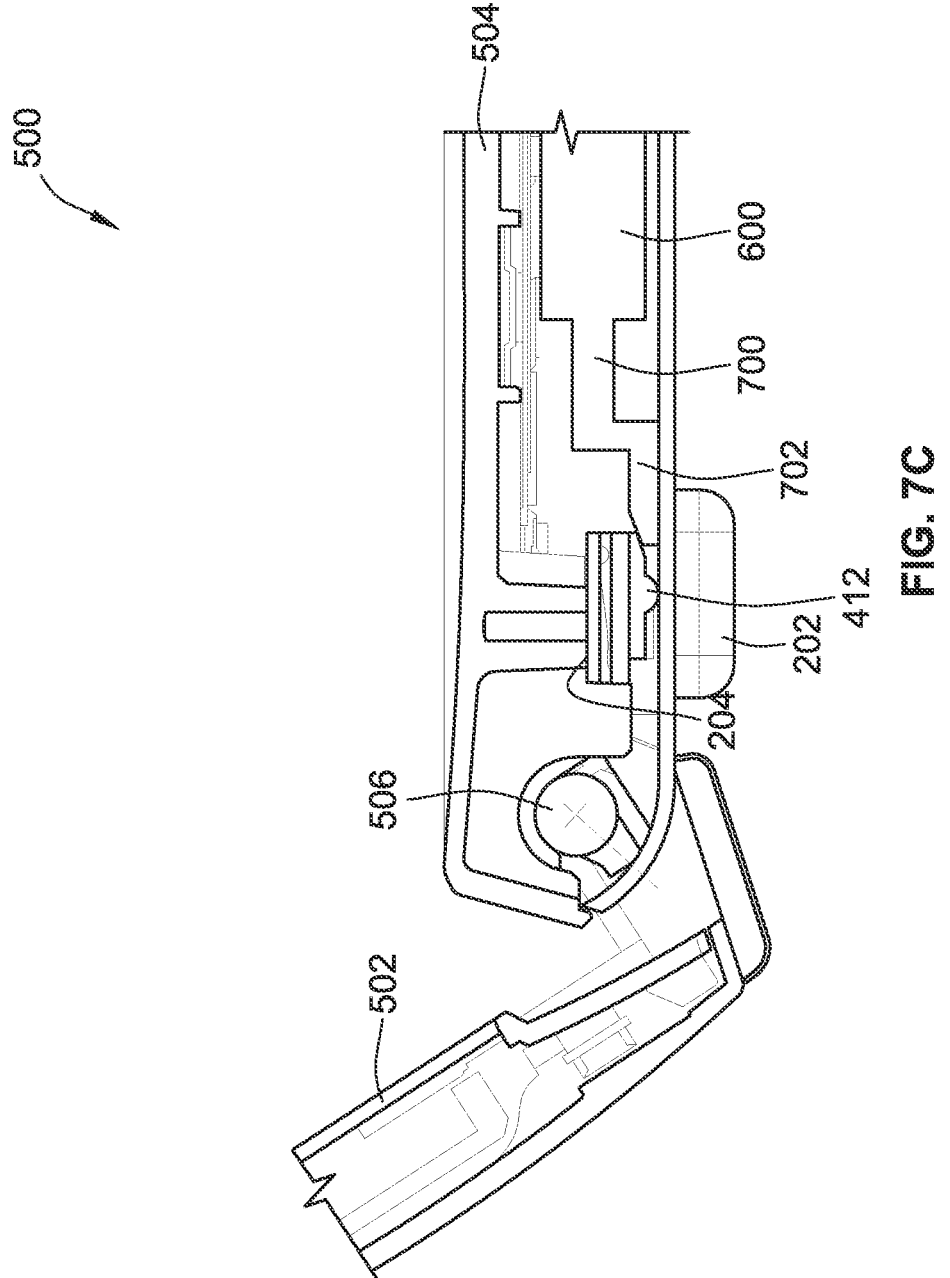
FIG. 7C is a cross-sectional view of a portion of the electronic device of FIG. 5 in a second open position.

FIG. 7C is a cross-sectional view of a portion of the electronic device 500 of FIG. 5 in a second open position. In the second open position, the lid or first panel 502 is opened more than 90°. When the electronic device 500 is in the second open position, the push rod 700 is retracted. When the push rod 700 is retracted, the engagement end 702 begins to move away from the extension 412 and partially disengage the extension 412. The engagement end 702 has an example inclined surface 704. As the engagement end 702 is pulled by the push rod 700 away from the deployable foot 202, the extension 412 slides down the inclined surface 704. In this position, the extension 412 moves to a position away from the backplate 204. Movement of the extension 412 away from the backplate 204 releases the biasing member 400. The biasing force of the biasing member 400 causes the biasing member 400 to expand from the backplate 204, which causes the extension 412 to slide down the inclined surface 704. The expanding biasing member 400 moves to an expanded position, which moves the deployable foot 202 to the extended or deployed position, as shown in FIG. 7C. Different Z-heights can be used in different applications of the deployable foot 202 according to, for example, the type of electronic device, number of fans, performance power, etc.

In examples in which the actuator 600 is a motor, electricity is applied to the motor when the electronic device 500 is in the second open position. In this example, when electricity is applied to the motor, the motor pulls the push rod 700 to the retracted position.

When the deployable foot 202 is in the deployed position, the deployable foot 202 has an extended height and forms a recirculation stopper. Warm or hot air that is expelled or exhausted out of the second panel 504 via, for example, example exhaust vents or outlet vents 706 is prevented from being recirculated back into the electronic device 500. The deployable foot 202 in the deployed position blocks such warm or hot air from reaching the intake vents 300.

When the first cover 502 is moved back to either the first open position or the closed position, the actuator 600 extends the push rod 700. The inclined surface 704 enables the engagement end 702 to engage the extension 412. The extension 412 is moved to a retracted position near the backplate 204, the biasing member 400 is compressed, and the deployable foot 202 is pulled to the retracted position. In examples in which the actuator 600 is a motor, the supply of electricity to the motor is shut off. In this example, when there is no electricity applied to the motor, the push rod 700 is in the extended position.

Figure 8:
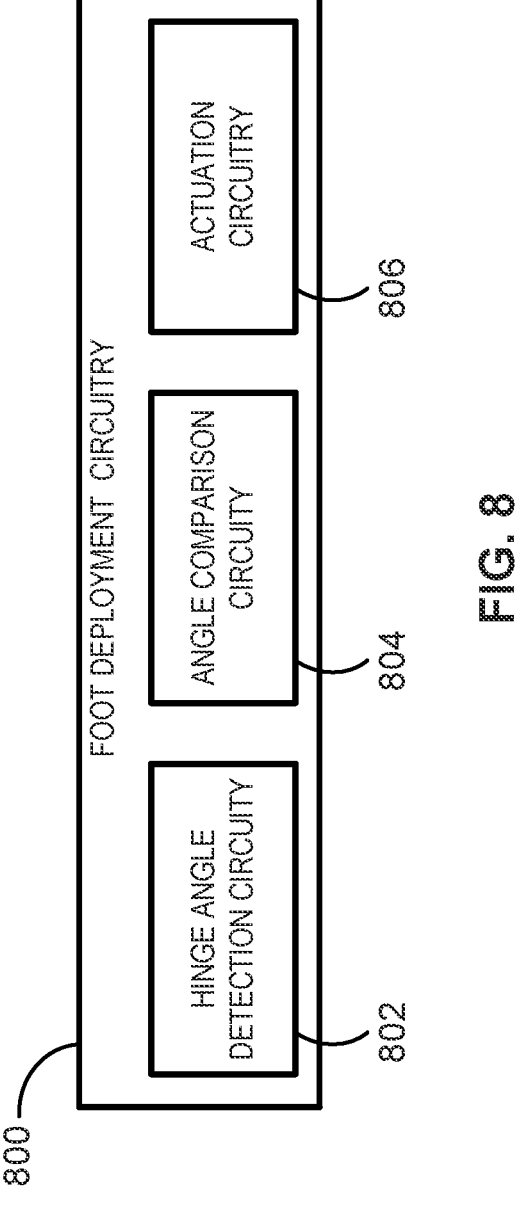
FIG. 8 is a block diagram of an example implementation of example foot deployment circuitry.

FIG. 8 is a block diagram of an example implementation of the foot deployment circuitry 800 to move the deployable foot 202 between the deployed position and the retracted position. The foot deployment circuitry 800 of FIG. 8 may be instantiated (e.g., creating an instance of, bring into being for any length of time, materialize, implement, etc.) by programmable circuitry such as a Central Processor Unit (CPU) executing first instructions. Additionally or alternatively, the foot deployment circuitry 800 of FIG. 8 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 8 may, thus, be instantiated at the same or different times. Some or all of the circuitry of FIG. 8 may be instantiated, for example, in one or more threads executing concurrently on hardware and/or in series on hardware. Moreover, in some examples, some or all of the circuitry of FIG. 8 may be implemented by microprocessor circuitry executing instructions and/or FPGA circuitry performing operations to implement one or more virtual machines and/or containers.

Figure 9:
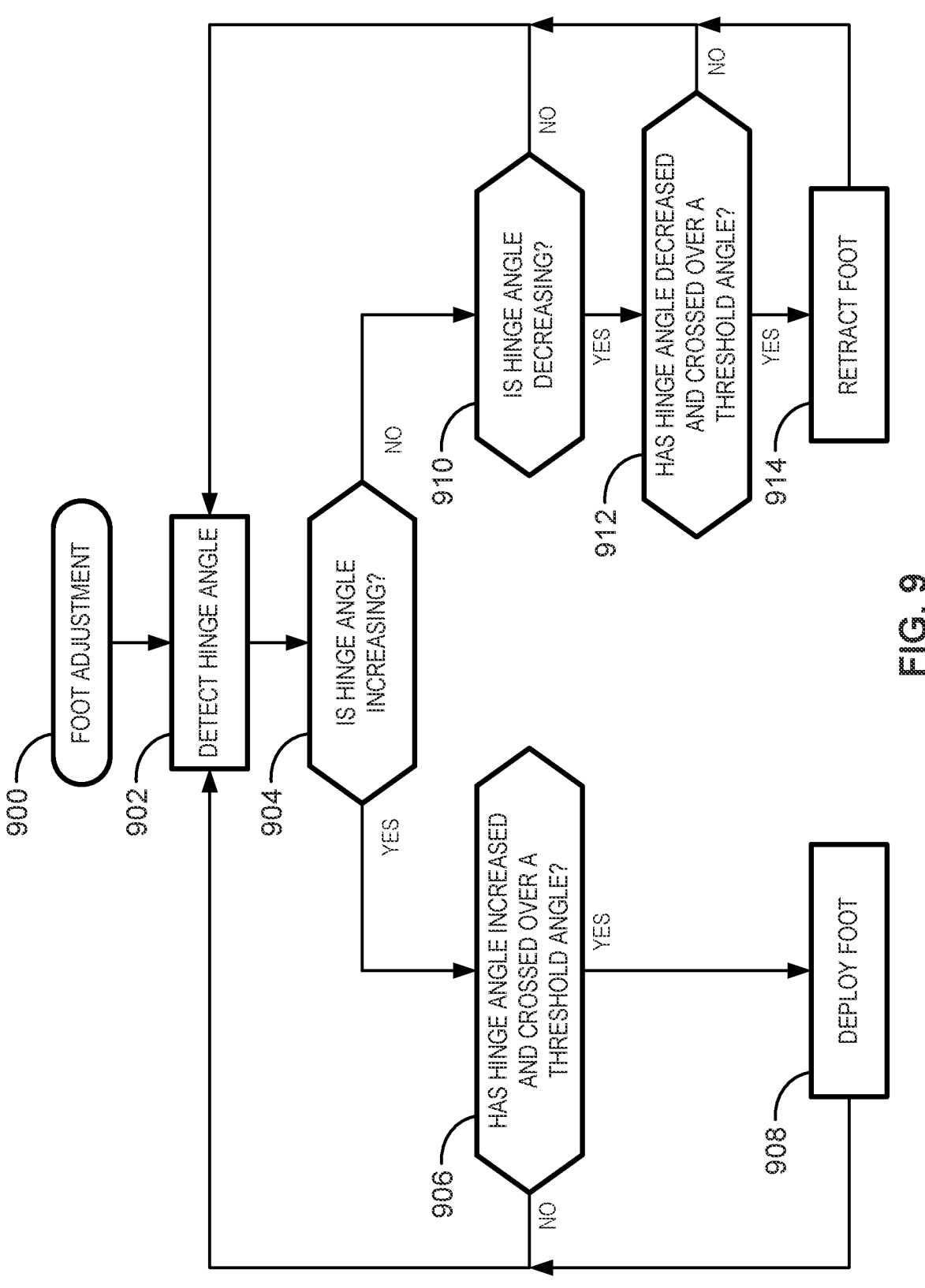
FIG. 9 is a flowchart representative of example machine readable instructions and/or example operations that may be executed, instantiated, and/or performed by example programmable circuitry to implement the foot deployment circuitry 800 of FIG. 8.

In some examples, the foot deployment circuitry 800 is instantiated by programmable circuitry executing foot deployment instructions and/or configured to perform operations such as those represented by the flowchart(s) of FIG. 9.

The foot deployment circuitry 800 includes example hinge angle detection circuitry 802, example angle comparison circuitry 804, and example actuation circuitry 806. The foot deployment circuitry 800 may be included in circuitry in the first panel 502 and/or the second panel 504. In some examples, elements of the foot deployment circuitry 800 are distributed throughout the electronic device 500.

The hinge angle detection circuitry 802 determines, accesses, or obtains a hinge angle which is an angle of the hinge 506. The hinge angle is indicative of the position of the first panel 502 relative to the second panel 504. In some examples, the hinge angle detection circuitry 802 is coupled to a sensor such as, for example, a gyroscope.

The angle comparison circuitry 804 compares the hinge angle to preceding hinge angles to calculate or determine if the hinge angle is increasing or decreasing. An increasing hinge angle indicates that the electronic device 500 is moving from the closed position (FIG. 7A) to an open position (FIG. 7B and/or FIG. 7C) or from the first open position (FIG. 7B) to the second open position (FIG. 7C). A decreasing hinge angle indicates that the electronic device 500 is moving from the second open position (FIG. 7C) to the first open position (FIG. 7B) or from an open position (FIG. 7B and/or FIG. 7C) to the closed position (FIG. 7A).

The angle comparison circuitry 804 compares the hinge angle to a threshold angle. The angle comparison circuitry 804 determines if the hinge angle crosses from under the threshold angle to over the threshold angle. In addition, the angle comparison circuitry 804 determines if the hinge angle crosses from over the threshold angle to under the threshold angle.

The actuation circuitry 806 causes deployment or retraction of the deployable foot. For example, when the angle comparison circuitry 804 determines that the hinge angle has crossed over the threshold angle, the actuation circuitry 806 causes deployment of the deployable foot 202. For example, the actuation circuitry 806 causes the actuator 600 to retract the push rod 700 and engagement end 702. The retracted push rod 700 and engagement end 702 allow the biasing member 400 to expand, which deploys the deployable foot 200.

When the angle comparison circuitry 804 determines that the hinge angle has crossed under the threshold angle, the actuation circuitry 806 causes retraction of the deployable foot 202. For example, the actuation circuitry 806 causes the actuator 600 to extend the push rod 700 and engagement end 702. The extended push rod 700 and engagement end 702 bring the extension 412 closer to the backplate 204, which compresses the biasing member and retracts the deployable foot 200.

While an example manner of implementing the foot deployment circuitry 800 is illustrated in FIG. 8, one or more of the elements, processes, and/or devices illustrated in FIG. 8 may be combined, divided, re-arranged, omitted, eliminated, and/or implemented in any other way. Further, the example hinge angle detection circuitry 802, the example angle comparison circuitry 804, the example actuation circuitry 806, and/or, more generally, the example foot deployment circuitry 800 of FIG. 8, may be implemented by hardware alone or by hardware in combination with software and/or firmware. Thus, for example, any of the example hinge angle detection circuitry 802, the example angle comparison circuitry 804, the example actuation circuitry 806, and/or, more generally, the example foot deployment circuitry 800, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example foot deployment circuitry 800 of FIG. 8 may include one or more elements, processes, and/or devices in addition to, or instead of, those illustrated in FIG. 8, and/or may include more than one of any or all of the illustrated elements, processes and devices.

Flowchart(s) representative of example machine readable instructions, which may be executed by programmable circuitry to implement and/or instantiate the foot deployment circuitry 800 of FIG. 8 and/or representative of example operations which may be performed by programmable circuitry to implement and/or instantiate the foot deployment circuitry 800 of FIG. 8, are shown in FIG. 9. The machine readable instructions may be one or more executable programs or portion(s) of one or more executable programs for execution by programmable circuitry such as the processor circuitry 1012 shown in the example processor platform 1000 discussed below in connection with FIG. 10 and/or may be one or more function(s) or portion(s) of functions to be performed by the example programmable circuitry (e.g., an FPGA) discussed below in connection with FIGS. 11 and/or 12. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 9, many other methods of implementing the example foot deployment circuitry 800 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed, instantiated, and/or performed by programmable circuitry to move or adjust the deployable foot 202 between the retracted and deployed positions. The example machine-readable instructions and/or the example operations 900 of FIG. 9 begin with the hinge angle detection circuitry 802 detecting the hinge angle (block 902).

The angle comparison circuitry 804 determines if the hinge angle is increasing (block 904). If and/or when the angle comparison circuitry 804 determines that the hinge angle is increasing (block 904: YES), the angle comparison circuitry 804 determines if the hinge angle has increased and crossed over a threshold angle (block 906). If and/or when the angle comparison circuitry 804 determines that the hinge angle has not crossed over the threshold angle (block 906: NO), the operations 900 continue with the hinge angle detection circuitry 802 detecting the hinge angle (block 902). If and/or when the angle comparison circuitry 804 determines that the hinge angle has crossed over the threshold angle (block 906: YES), the actuation circuitry 806 deploys the deployable foot 202 (block 908). After the actuation circuitry 806 deploys the deployable foot, the operations 900 continue with the hinge angle detection circuitry 802 detecting the hinge angle (block 902).

If and/or when the angle comparison circuitry 804 determines that the hinge angle is not increasing (block 904: NO), the angle comparison circuitry 804 determines if the hinge angle is decreasing (block 910). If and/or when the angle comparison circuitry determines that the hinge angle is not decreasing (block 910: NO), the operations 900 continue with the hinge angle detection circuitry 802 detecting the hinge angle (block 902).

If and/or when the angle comparison circuitry 804 determines that the hinge angle is decreasing (block 910: YES), the angle comparison circuitry 804 determines if the hinge angle has decreased and crossed under the threshold angle (block 912). If and/or when the hinge angle comparison circuitry 804 determines that the hinge angle has not crossed under the threshold angle (block 912: NO), the operations 900 continue with the hinge angle detection circuitry 802 detecting the hinge angle (block 902). If and/or when the angle comparison 804 circuitry determines that the hinge angle has crossed under the threshold angle (block 912: YES), the actuation circuitry 806 retracts the deployable foot 202 (block 914). After the actuation circuitry 806 retracts the deployable foot, the operations 900 continue with the hinge angle detection circuitry 802 detecting the hinge angle (block 902).

Figure 10:
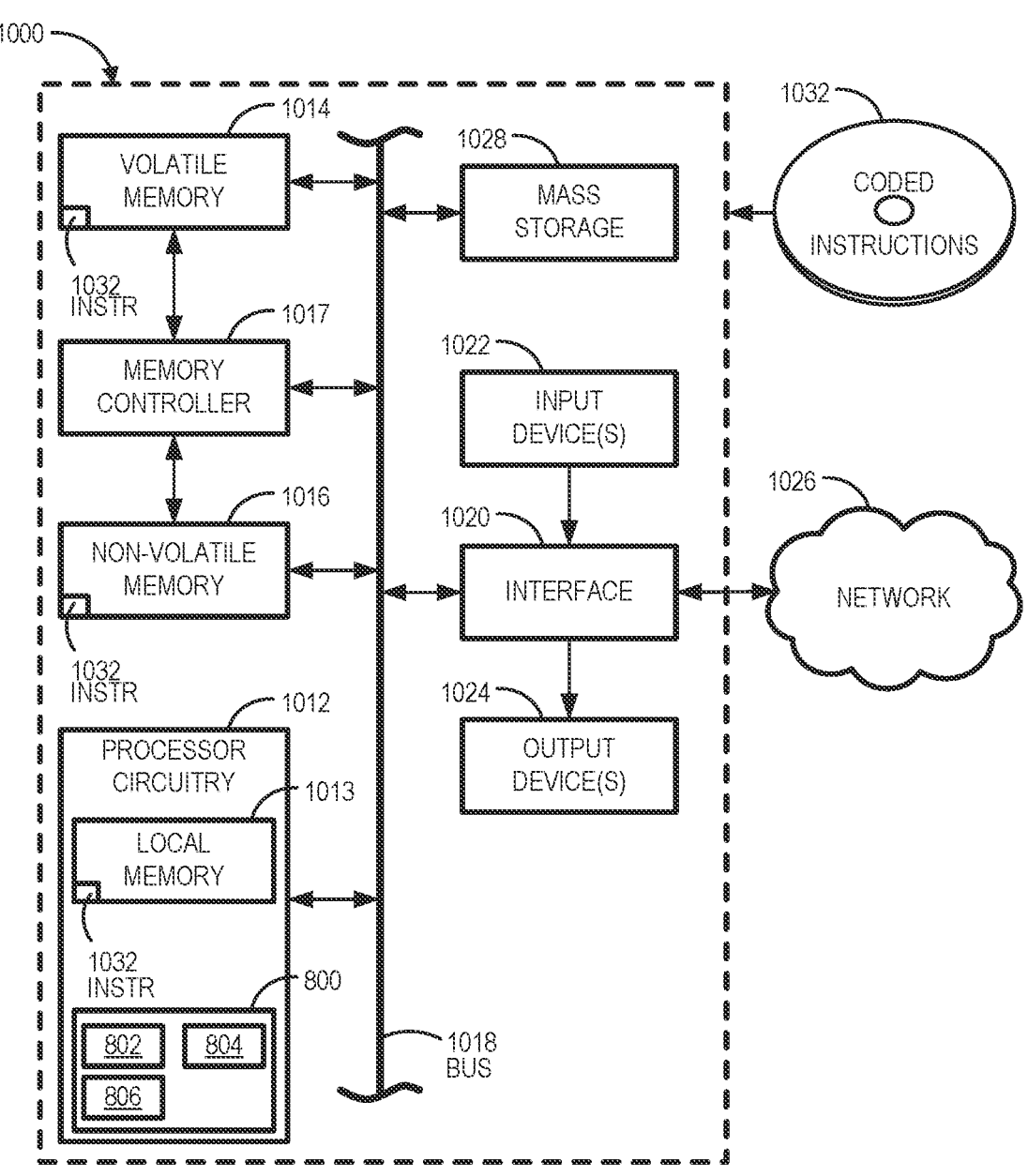
FIG. 10 is a block diagram of an example processing platform including programmable circuitry structured to execute, instantiate, and/or perform the example machine readable instructions and/or perform the example operations of FIG. 9 to implement the foot deployment circuitry 800 of FIG. 8.

FIG. 10 is a block diagram of an example programmable circuitry platform 1000 structured to execute and/or instantiate the example machine-readable instructions and/or the example operations of FIG. 9 to implement the foot deployment circuitry 800 of FIG. 8. The programmable circuitry platform 1000 can be, for example, a server, a personal computer, a workstation, a self-learning machine (e.g., a neural network), or any other type of computing and/or electronic device.

The programmable circuitry platform 1000 of the illustrated example includes programmable circuitry 1012. The programmable circuitry 1012 of the illustrated example is hardware. For example, the programmable circuitry 1012 can be implemented by one or more integrated circuits, logic circuits, FPGAS, microprocessors, CPUs, GPUs, DSPs, and/or microcontrollers from any desired family or manufacturer. The programmable circuitry 1012 may be implemented by one or more semiconductor based (e.g., silicon based) devices. In this example, the programmable circuitry 1012 implements the hinge angle detection circuitry 802, the angle comparison circuitry 804, the actuation circuitry 806, and the foot deployment circuitry 800.

The programmable circuitry 1012 of the illustrated example includes a local memory 1013 (e.g., a cache, registers, etc.). The programmable circuitry 1012 of the illustrated example is in communication with main memory 1014, 1016, which includes a volatile memory 1014 and a non-volatile memory 1016, by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017. In some examples, the memory controller 1017 may be implemented by one or more integrated circuits, logic circuits, microcontrollers from any desired family or manufacturer, or any other type of circuitry to manage the flow of data going to and from the main memory 1014, 1016.

The programmable circuitry platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user (e.g., a human user, a machine user, etc.) to enter data and/or commands into the programmable circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a beyond-line-of-site wireless system, a line-of-site wireless system, a cellular telephone system, an optical connection, etc.

The programmable circuitry platform 1000 of the illustrated example also includes one or more mass storage discs or devices 1028 to store firmware, software, and/or data. Examples of such mass storage discs or devices 1028 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1032, which may be implemented by the machine readable instructions of FIG. 9, may be stored in the mass storage device 1028, in the volatile memory 1014, in the non-volatile memory 1016, and/or on at least one non-transitory computer readable storage medium such as a CD or DVD which may be removable.

Figure 11:
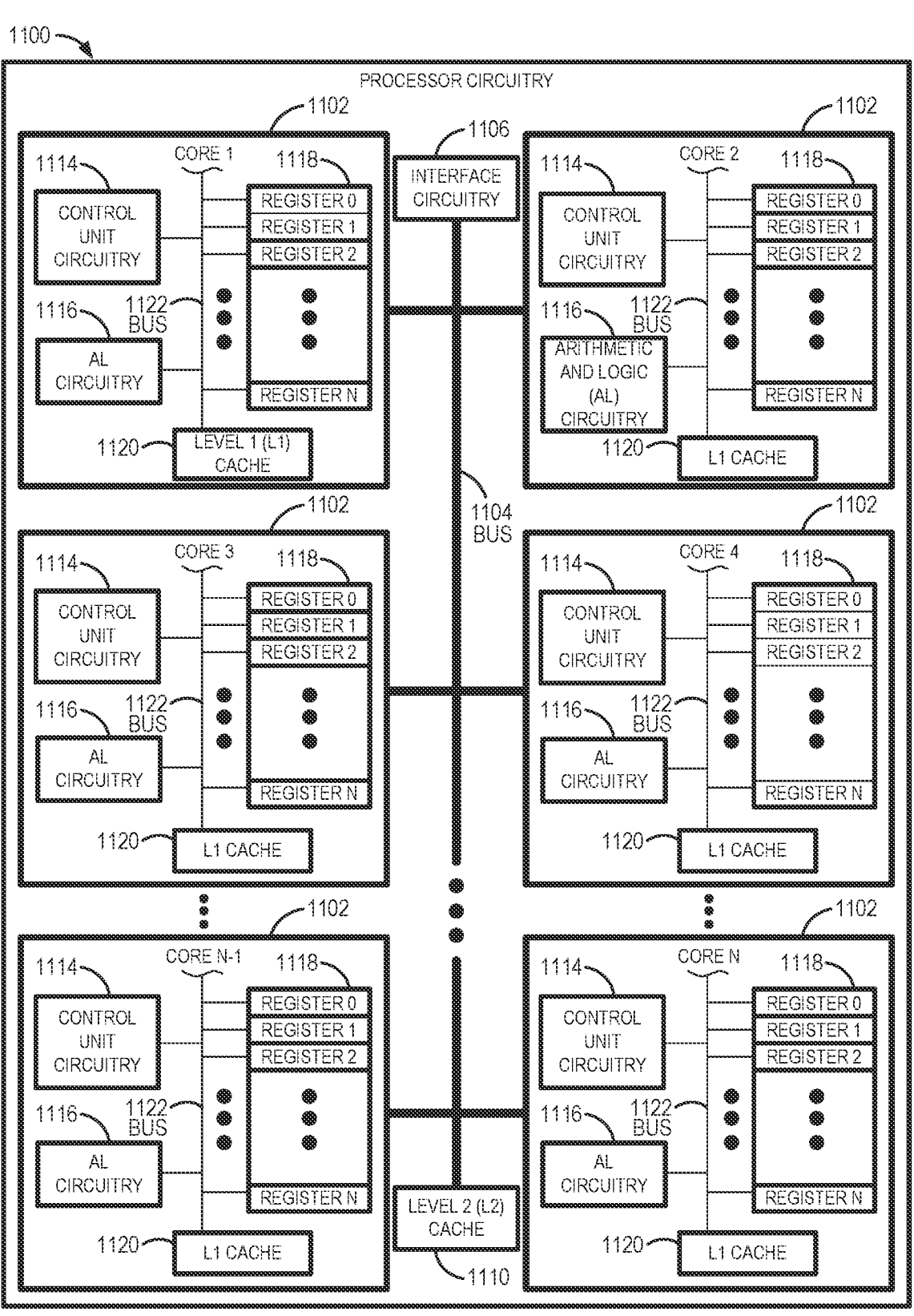
FIG. 11 is a block diagram of an example implementation of the programmable circuitry of FIG. 10.

FIG. 11 is a block diagram of an example implementation of the programmable circuitry 1012 of FIG. 10. In this example, the programmable circuitry 1012 of FIG. 10 is implemented by a microprocessor 1100. For example, the microprocessor 1100 may be a general-purpose microprocessor (e.g., general-purpose microprocessor circuitry). The microprocessor 1100 executes some or all of the machine-readable instructions of the flowcharts of FIG. 9 to effectively instantiate the circuitry of FIG. 8 as logic circuits to perform operations corresponding to those machine readable instructions. In some such examples, the foot deployment circuitry 800 is instantiated by the hardware circuits of the microprocessor 1100 in combination with the machine-readable instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIG. 9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores

1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating-point operations. In yet other examples, the AL circuitry 1116 may include first AL circuitry that performs integer-based operations and second AL circuitry that performs floating-point operations. In some examples, the AL circuitry 1116 may be referred to as an Arithmetic Logic Unit (ALU).

The registers 1118 are semiconductor-based structures to store data and/or instructions such as results of one or more of the operations performed by the AL circuitry 1116 of the corresponding core 1102. For example, the registers 1118 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure, such as by being distributed throughout the core 1102 to shorten access time. The second bus 1122 may be implemented by at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages.

The microprocessor 1100 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1100, in the same chip package as the microprocessor 1100 and/or in one or more separate packages from the microprocessor 1100.

Figure 12:
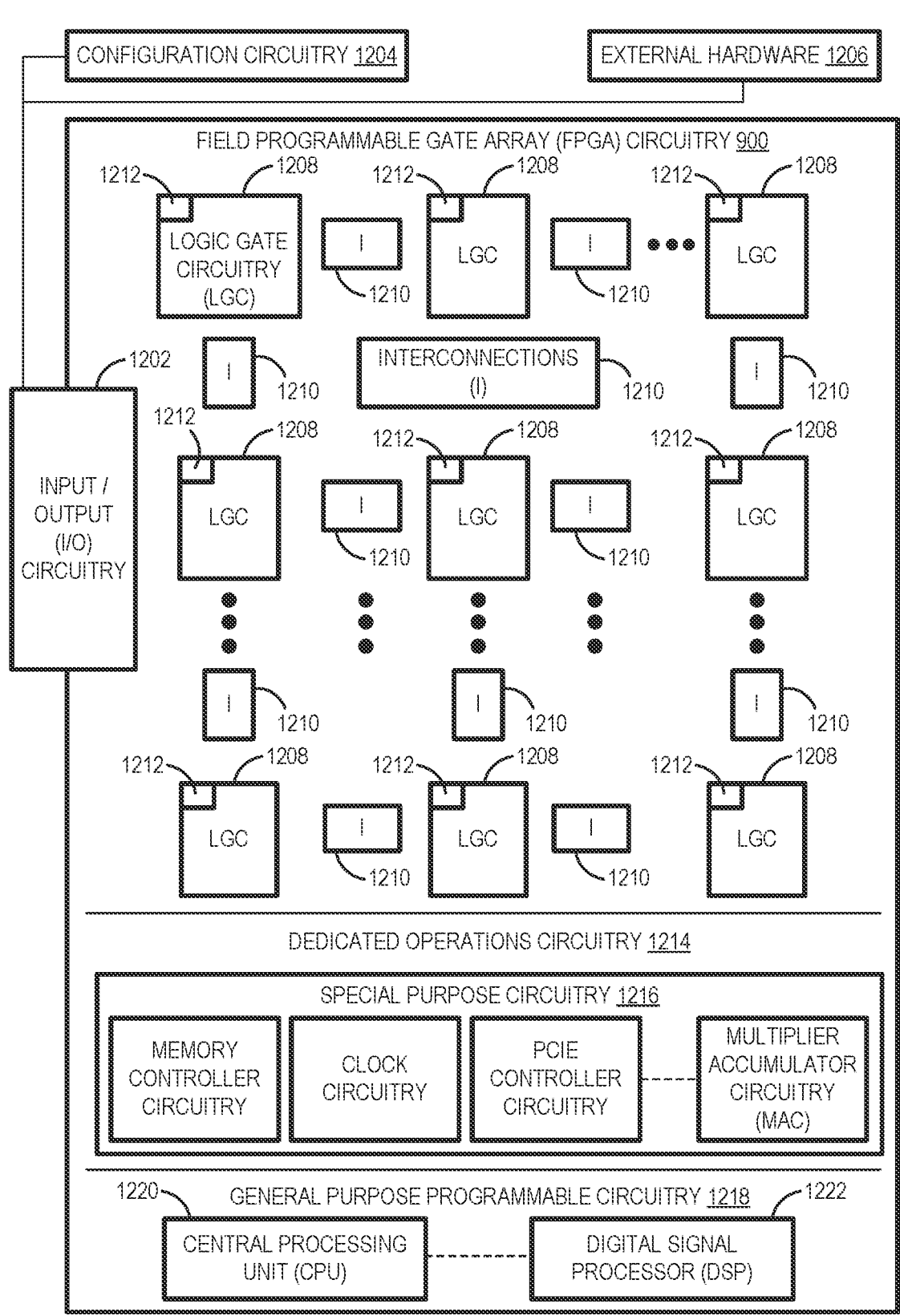
FIG. 12 is a block diagram of another example implementation of the programmable circuitry of FIG. 10.

FIG. 12 is a block diagram of another example implementation of the programmable circuitry 1012 of FIG. 10. In this example, the programmable circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1100 of FIG. 11 described above (which is a general purpose device that may be programmed to execute some or all of the machine readable instructions represented by the flowchart(s) of FIG. 9 but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine readable instructions represented by the flowchart(s) of FIG. 9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIG. 9. As such, the FPGA circuitry 1200 may be configured and/or structured to effectively instantiate some or all of the operations/functions corresponding to the machine readable instructions of the flowchart(s) of FIG. 9 as dedicated logic circuits to perform the operations/functions corresponding to those software instructions in a dedicated manner analogous to an ASIC. Therefore, the FPGA circuitry 1200 may perform the operations/functions corresponding to the some or all of the machine readable instructions of FIG. 9 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by the microprocessor 1100 of FIG. 11.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine readable instructions of FIG. 9 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the programmable circuitry 1012 of FIG. 10, many other approaches are contemplated. For example, FPGA circuitry may include an on-board CPU, such as one or more of the example CPU 1220 of FIG. 11. Therefore, the programmable circuitry 1012 of FIG. 10 may additionally be implemented by combining at least the example microprocessor 1100 of FIG. 11 and the example FPGA circuitry 1200 of FIG. 12. In some such hybrid examples, one or more cores 1102 of FIG. 11 may execute a first portion of the machine readable instructions represented by the flowchart(s) of FIG. 9 to perform first operation(s)/function(s), the FPGA circuitry 1200 of FIG. 12 may be configured and/or structured to perform second operation(s)/function(s) corresponding to a second portion of the machine readable instructions represented by the flowcharts of FIG. 9, and/or an ASIC may be configured and/or structured to perform third operation(s)/function(s) corresponding to a third portion of the machine readable instructions represented by the flowcharts of FIG. 9.

It should be understood that some or all of the circuitry of FIG. 8 may, thus, be instantiated at the same or different times. For example, same and/or different portion(s) of the microprocessor 1100 of FIG. 11 may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 8 may be instantiated, for example, in one or more threads executing concurrently and/or in series. For example, the microprocessor 1100 of FIG. 11 may execute machine readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 8 may be implemented within one or more virtual machines and/or containers executing on the microprocessor 1100 of FIG. 11.

In some examples, the programmable circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the programmable circuitry 1012 of FIG. 10, which may be in one or more packages. For example, the XPU may include a CPU (e.g., the microprocessor 1100 of FIG. 11, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
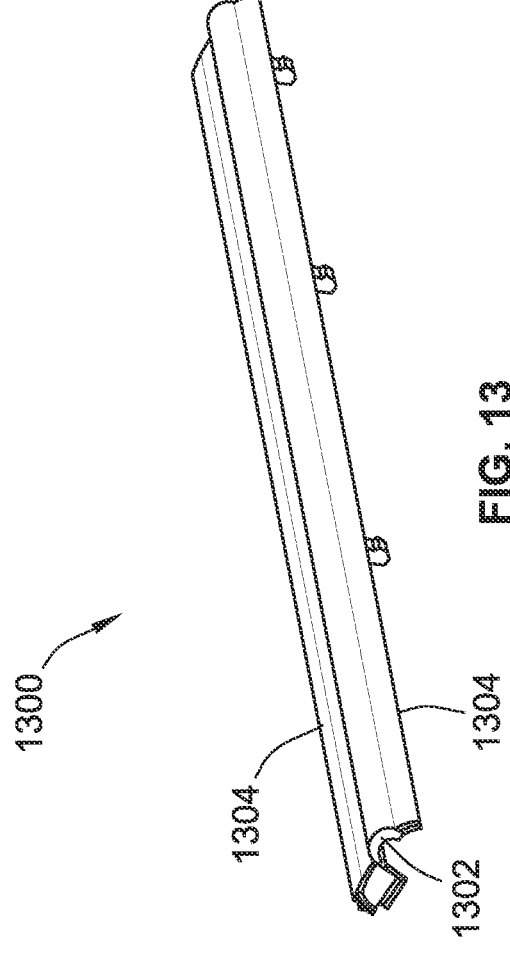
FIG. 13 is a perspective view of an example hinge gasket.

FIG. 13 is a perspective view of an example hinge gasket 1300 that may be used as part of the thermal solutions of the electronic device 500 to prevent recirculation of warm or hot air exhausted from the electronic device 500. The hinge gasket 1300 includes an example flexible seal 1302 and example support strips 1304. In some examples, the flexible seal 1302 includes a compressible rubber. In some examples, the support strips 1304 are plastic. In some examples, the electronic device 500 with the hinge gasket 1300 does not include the deployable foot 202. In such examples, the hinge gasket 1300 alone prevents recirculation of warm or hot air.

Figure 14A:
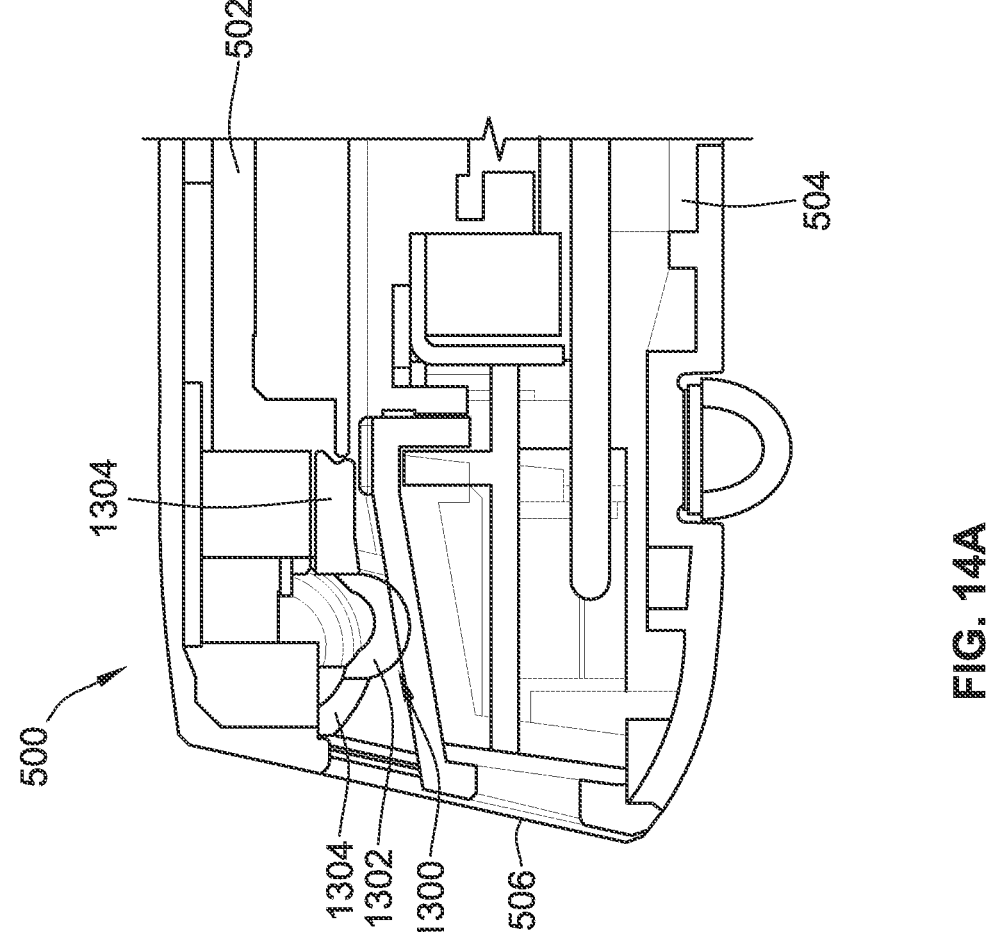
FIG. 14A is a cross-sectional view of a portion of an electronic device in a closed position including the hinge gasket of FIG. 13.

FIG. 14A is a cross-sectional view of a portion of the electronic device 500 in a closed position including the hinge gasket 1300 of FIG. 13. In this example, the hinge gasket 1300 is coupled to the first panel 502. The support strips 1304 couple the hinge gasket 1300 to and end of the first panel 502 near the hinge 506. In other examples, the hinge gasket 1300 is coupled to the second panel 504. When the electronic device 500 is in the closed position, the flexible seal 1302 is compressed.

Figure 14B:
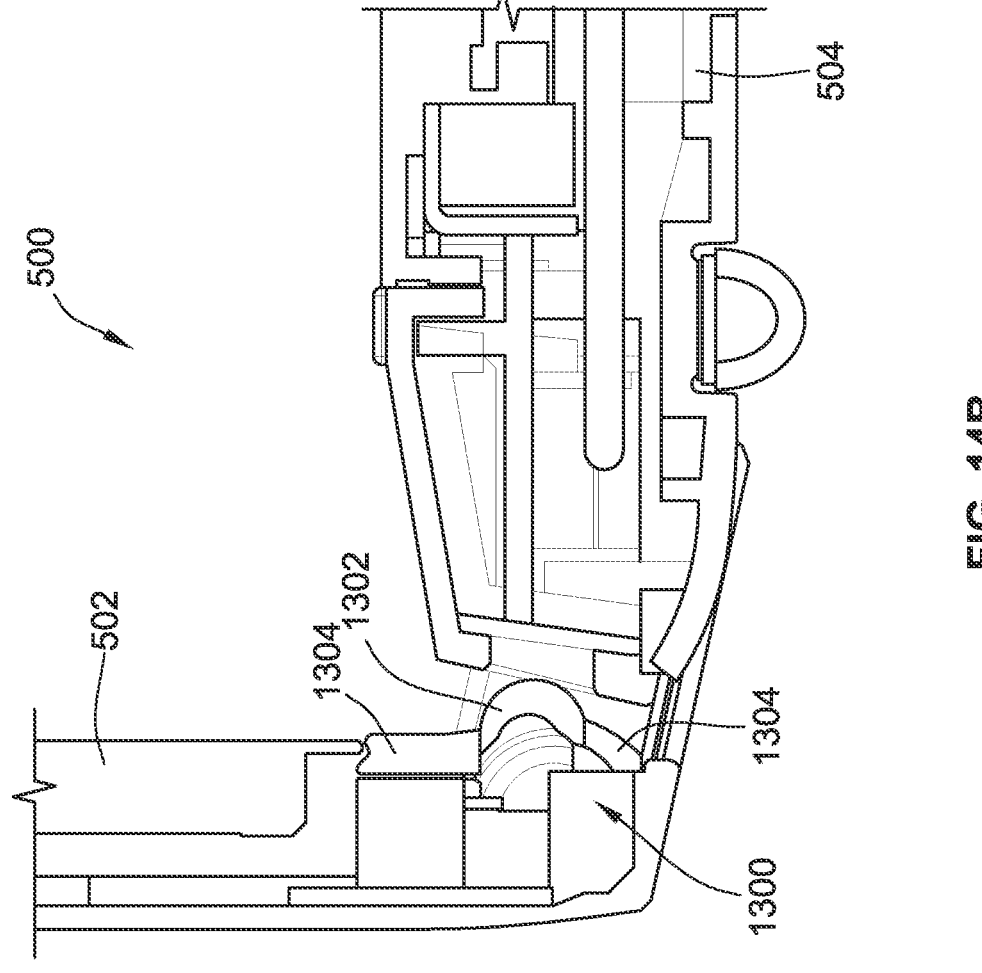
FIG. 14B is a cross-sectional view of a portion of the electronic device of FIG. 14A in a first open position including the hinge gasket of FIG. 13.
Figure 14C:
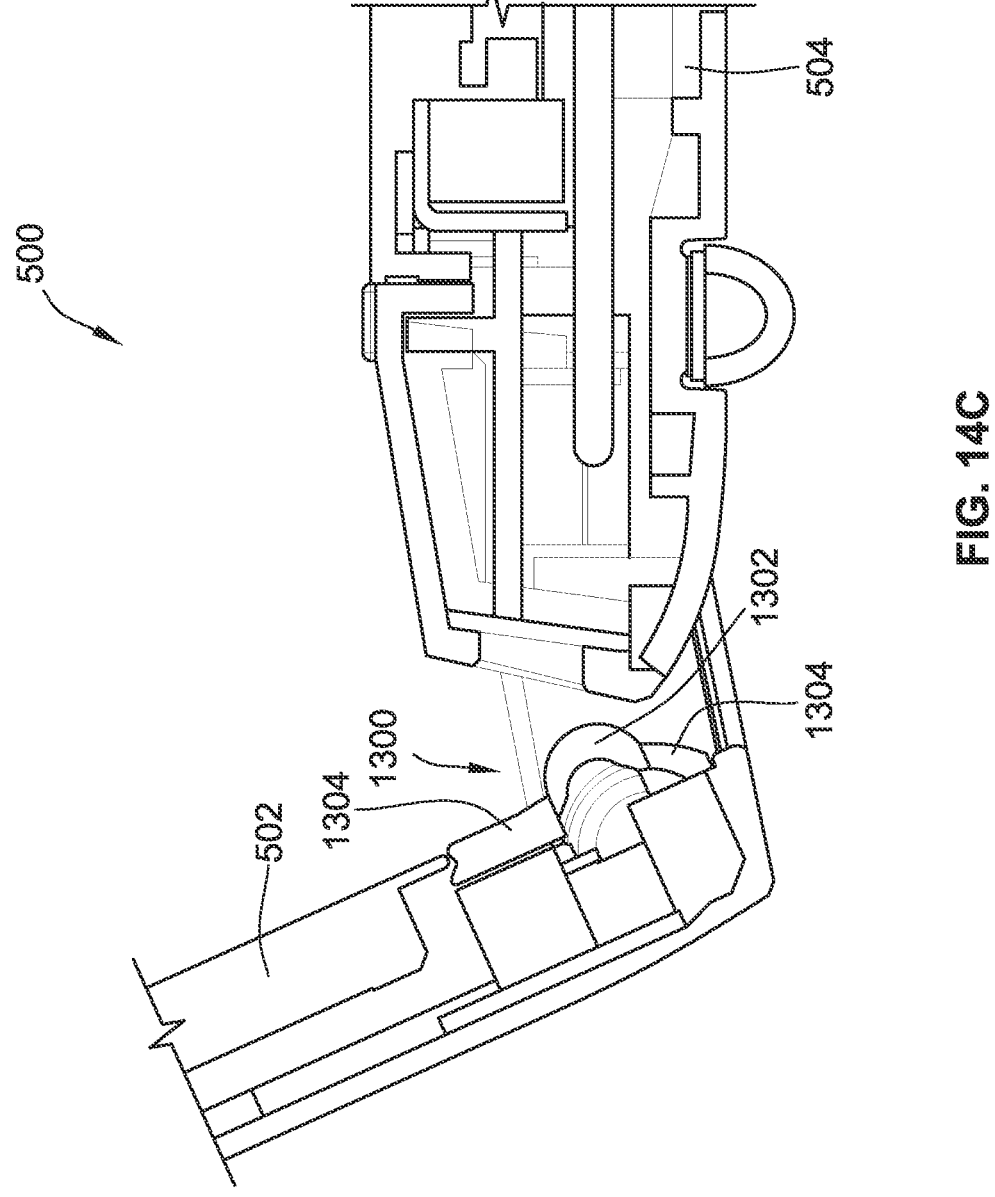
FIG. 14C is a cross-sectional view of a portion of the electronic device of FIG. 14A in a second open position including the hinge gasket of FIG. 13.

FIG. 14B is a cross-sectional view of a portion of the electronic device 500 in a first open position including the hinge gasket 1300 of FIG. 13. In this example, the first open position includes the first panel 502 opened relative to the second panel 504 at an angle of about 90°. FIG. 14C is a cross-sectional view of a portion of the electronic device 500 in a second open position including the hinge gasket 1300 of FIG. 13. In this example, the second open position includes the first panel 502 opened relative to the second panel 504 at an angle of about 105°. In both the first open position and the second open position, the flexible seal 1302 is spaced from, i.e., does not make contact with the end of the second panel 504. Air may pass between the first panel 502 and the second panel 504.

Figure 14D:
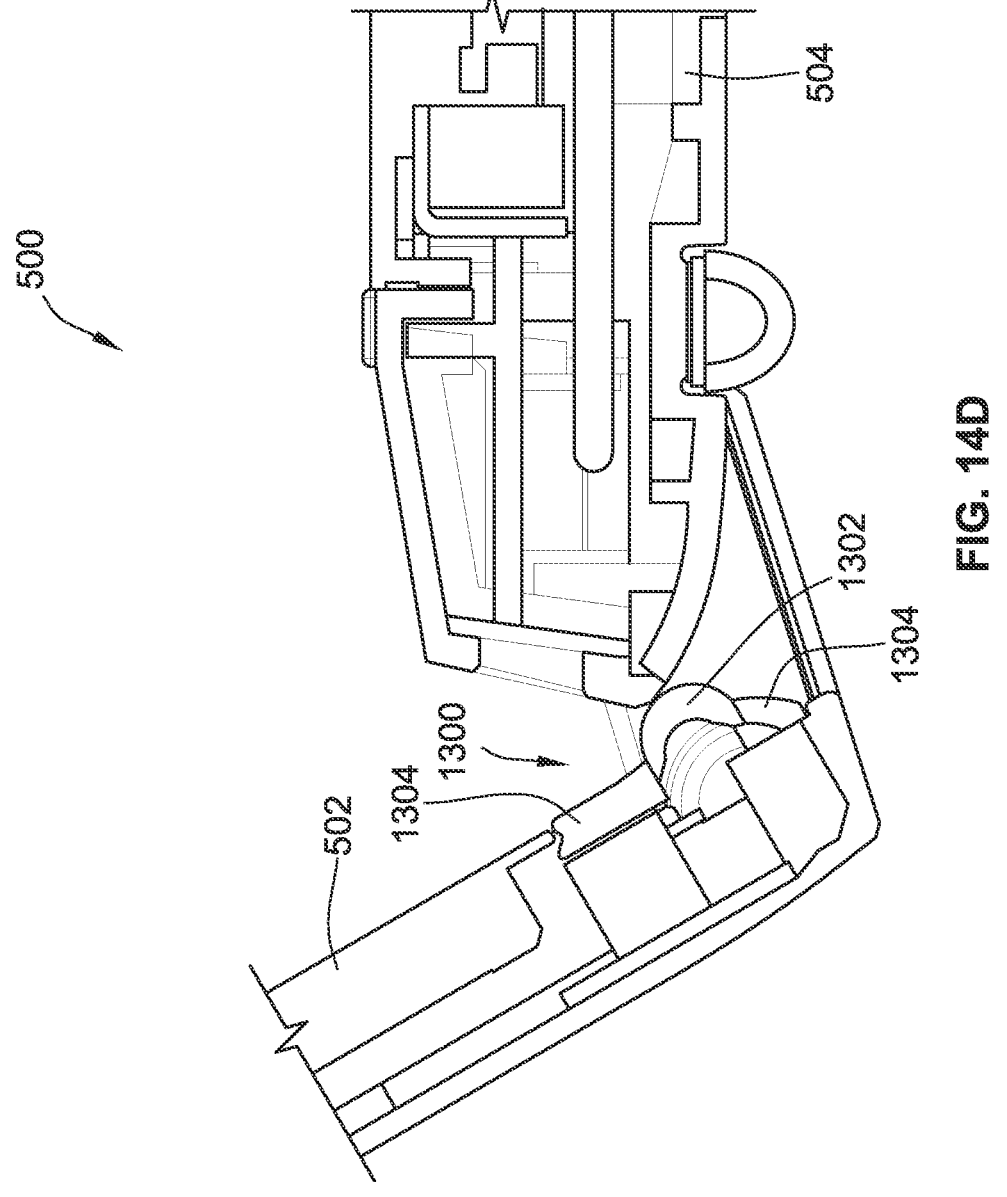
FIG. 14D is a cross-sectional view of a portion of the electronic device of FIG. 14A in a third open position including the hinge gasket of FIG. 13.

FIG. 14D is a cross-sectional view of a portion of the electronic device of FIG. 14A in a third open position including the hinge gasket 1300 of FIG. 13. In this example, the second open position includes the first panel 502 opened relative to the second panel 504 at an angle of about 120°. In the third open position, the flexible seal 1302 makes contact with the second panel 504 and blocks airflow.

Figure 14E:
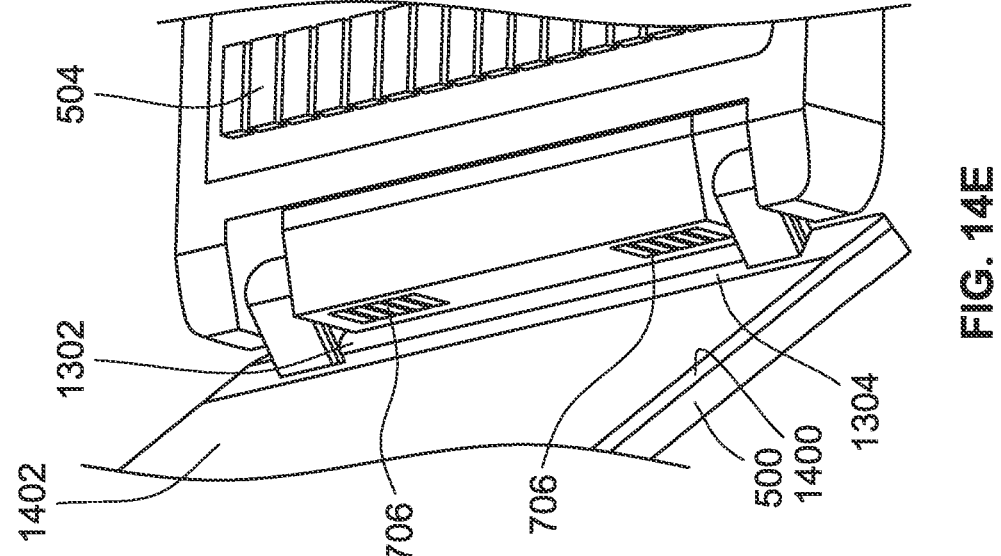
FIG. 14E is a perspective view of a portion of the electronic device of FIG. 14C.

FIG. 14E is a perspective view of a portion of the electronic device 500 in the third open position of FIG. 14C. The hinge gasket 1300 is coupled via the support strips 1304 to an example bezel 1400 around an example display 1402 of the first panel 502. The hinge gasket 1300 is coupled at the lower end of the first panel 502. In the third open position, the flexible seal 1302 contacts the second panel 504 beneath the outlet vents 706. The flexible seal 1302 prevents air exhausted from the outlet vents 706 from flowing under the second panel 504 toward the intake vents 300. Thus, the air exhausted from the outlet vents 706 flows in an upward direction along the display 1402.

Figure 15:
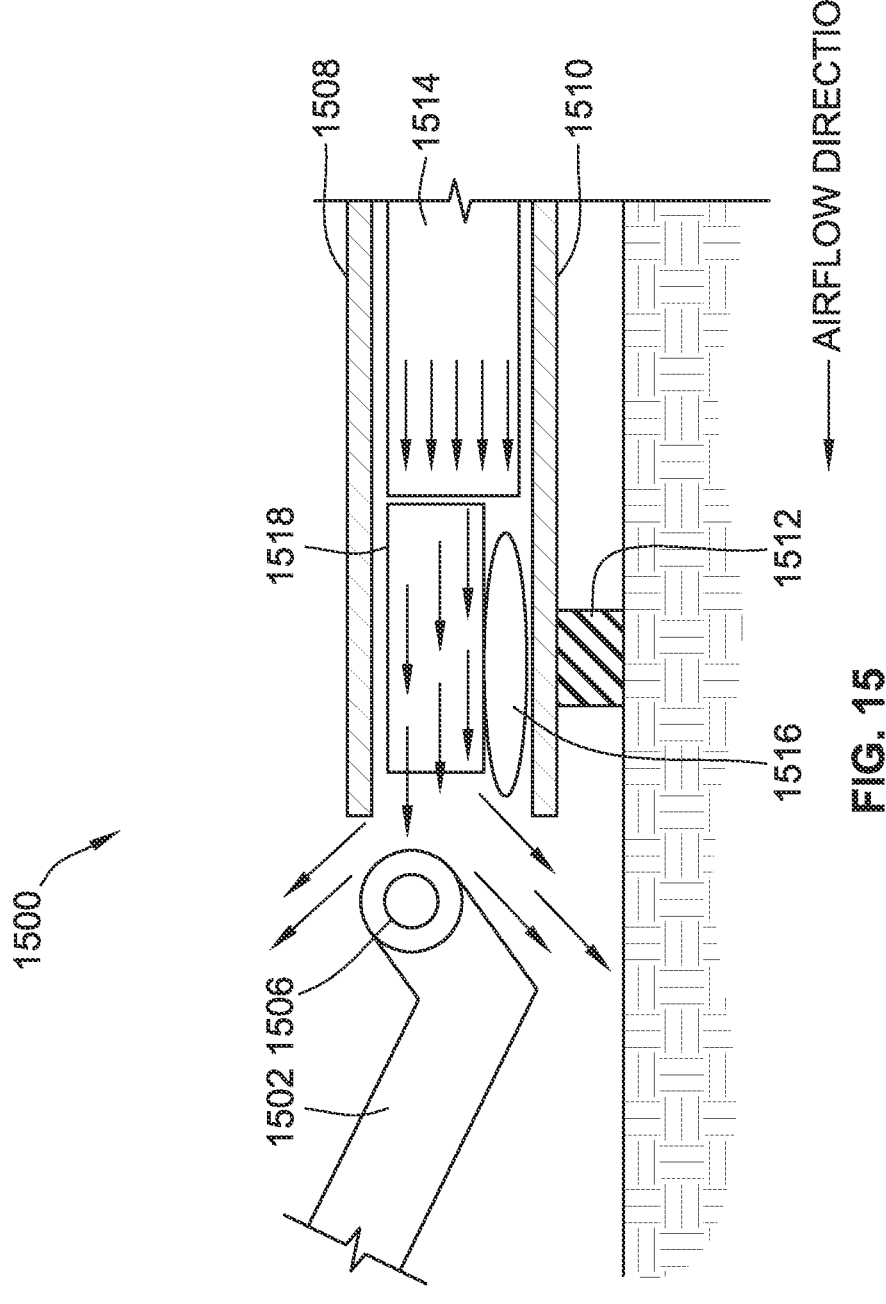
FIG. 15 is a schematic illustration of a portion of an electronic device without a hinge gasket.

In other examples, hinge gaskets may provide improved acoustic conditions during the operation of electronic devices. For example, a hinge gasket may be used to dampen fan noise. FIG. 15 is a schematic illustration of a portion of an electronic device 1500 without a hinge gasket. The electronic device 1500 includes a first panel 1502 that includes a display and a second panel 1504. The first panel 1502 and the second panel 1504 are coupled by a hinge 1506. The second panel 1504 includes a top cover or C cover 1508 and a bottom cover or D cover 1510. A support foot 1512 is coupled to the D cover 1510. Between the C cover 1508 and the D cover 1510 are internal components such as a fan 1514, heat pipe 1516, and fins 1518. The arrows show airflow from the fan 1514. The airflow is unrestricted around the hinge 1506. Similarly, sound waves produced by the operation of the fan also are unrestricted around the hinge 1506. This noise is disruptive to the user of the electronic device 1500.

Figure 16:
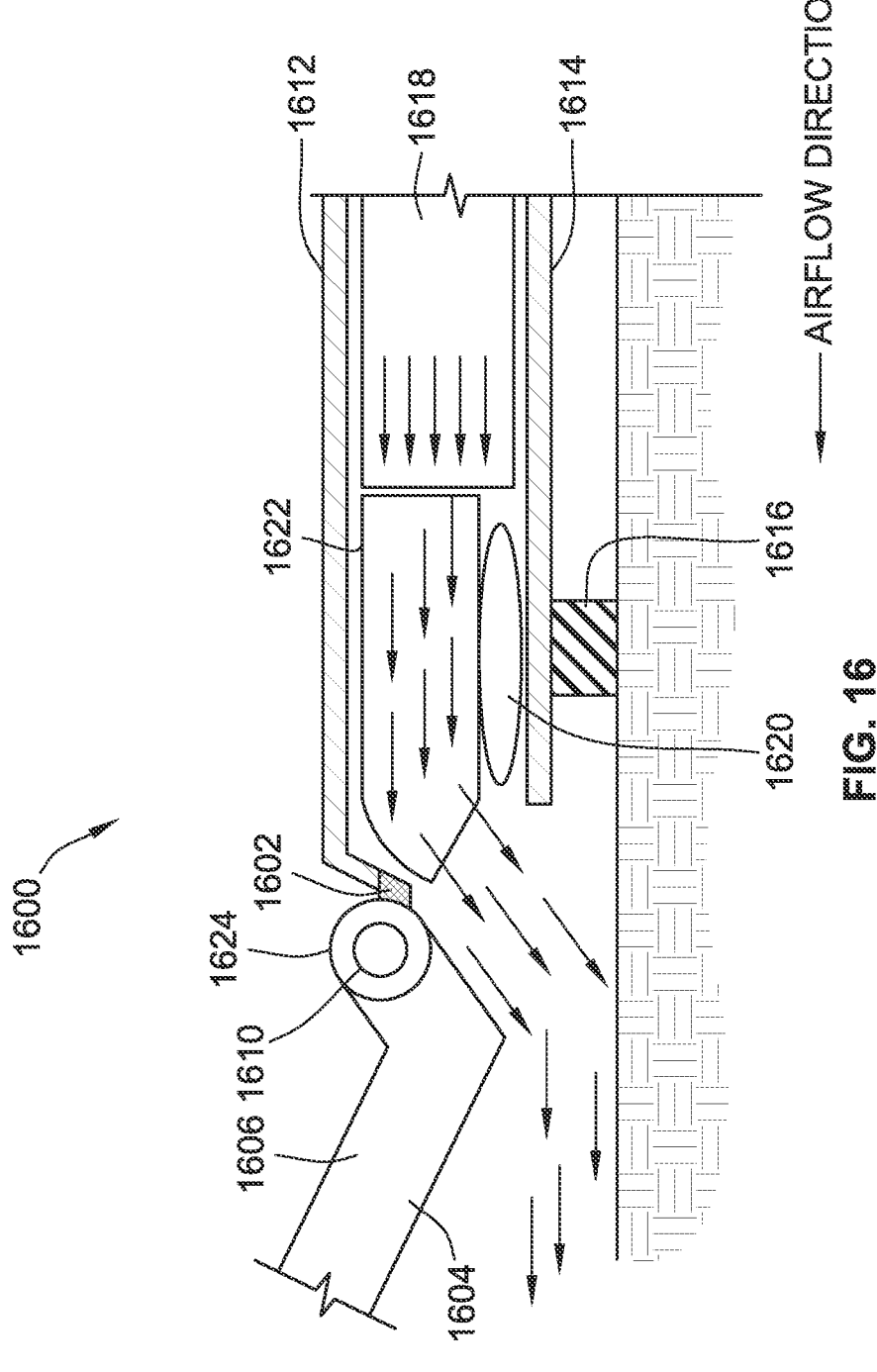
FIG. 16 is a schematic illustration of a portion of an electronic device including an alternative example hinge gasket.

FIG. 16 is a schematic illustration of a portion of an example electronic device 1600 including an alternative example hinge gasket 1602. The electronic device 1600 may be the electronic device 500 disclosed above. The electronic device 1600 includes an example first panel 1604 that includes an example display 1606. The electronic device 1600 also includes an example second panel 1608. The first panel 1604 and the second panel 1608 are coupled by an example hinge 1610. The second panel 1608 includes an example top cover or C cover 1612 and an example bottom cover or D cover 1614. An example support foot 1616 is coupled to the D cover 1614. In some examples, the support foot 1616 is the deployable foot 202.

Between the C cover 1612 and the D cover 1614 are internal components such as an example fan 1618, an example heat pipe 1620, and example fins 1622. The arrows show airflow from the fan 1618. The hinge gasket 1602 blocks the airflow around the hinge 1610 between the first cover 1604 and the second cover 1608. Similarly, sound waves produced by the operation of the fan 1618 also are restricted around the hinge 1610. Thus, the noise that emanates from the fan 1618 is blocked by the hinge gasket 1602 and does not travel up the hinge 1610. Thus, the hinge gasket 1602 serves as a sound or acoustic insulator.

The hinge gasket 1602 is shown coupled to the second panel 1608. In this example, there is a circular interface 1624 between the first panel 1604 and the hinge gasket 1602. The hinge gasket 1602 will maintain a seal between the first cover 1604 and the second over 1608 when the first cover 1604 is rotated through any angle of rotation including, for example, 180°. In this example, the hinge gasket 1602 completely fills the gap between the first panel 1604 and the second panel 1608 and does not impede movement of the first panel 1604 during opening, closing, and rotating of the first panel 1604 about the hinge 1610.

In some examples, the hinge gasket 1602 is made of a soft material. In some examples, the hinge gasket 1602 is made of a noise absorption material so the hinge gasket 1602 absorbs some of the fan noise. For example, the hinge gasket 1602 may be made of a fluoropolymer such as, for example, polytetrafluoroethylene (e.g., Teflon®). In some examples, the hinge gasket 1602 may be made of a thermoplastic such as, for example, polyetheretherketone (PEEK). In some examples, the hinge gasket 1602 may be made of other materials or combinations of materials that have acoustic absorption properties. Also, in some examples, the properties of the material of the hinge gasket 1602 have low-friction and self-lubrication effect, to enable the hinge 1610 to freely, quietly, and reliably rotate.

Figure 17:
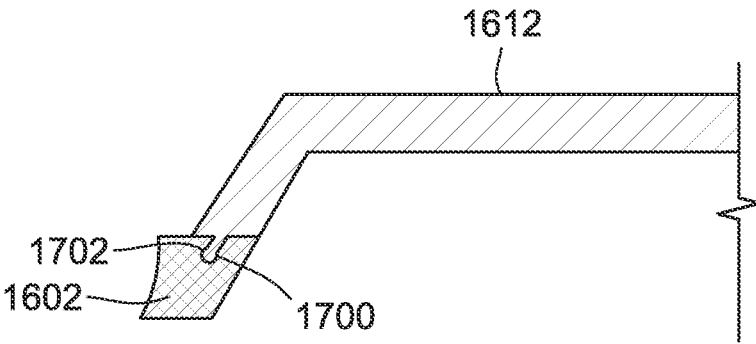
FIG. 17 is a schematic illustration of a first example coupling of the hinge gasket of FIG. 16 to an example cover of an electronic device.

FIG. 17 is a schematic illustration of a first example coupling of the hinge gasket 1602 of FIG. 16 to the C cover 1612 of the electronic device 1600. In this example, the C cover 1612 includes an example support pin 1700 for insert molding the hinge gasket 1602 to the C cover 1612. The hinge gasket 1602 includes an example recess 1702 about which the hinge gasket 1602 is supported on the support pin 1700.

Figure 18:
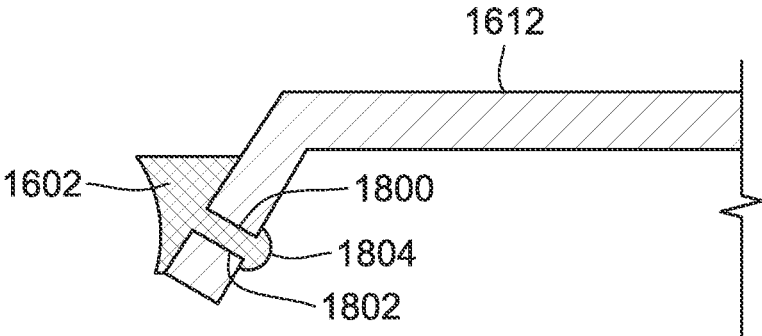
FIG. 18 is a schematic illustration of a second example coupling of the hinge gasket of FIG. 16 to an example cover of an electronic device.

FIG. 18 is a schematic illustration of a second example coupling of the hinge gasket 1602 of FIG. 16 to the C cover 1612 of the electronic device 1600. The example of FIG. 18 includes hot melt fixation. The C cover 1612 includes an example aperture 1800. The hinge gasket 1602 includes an example gasket extension 1802 that is inserted through the aperture 1800. The gasket extension 1802 includes an example head 1804. The head 1084 has a width or diameter that is greater than the width or diameter of the aperture 1800, which prevents removal of the hinge gasket 1602.

Figure 19:
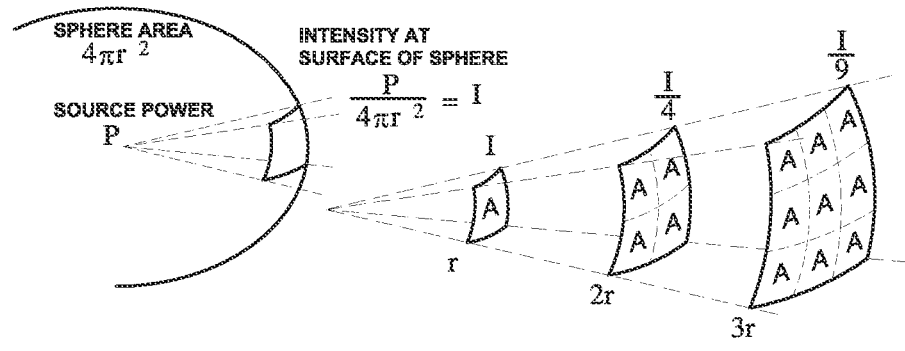
FIG. 19 is a diagram showing example sound energy dispersion over area compared to distance from the sound source.

FIG. 19 is a diagram showing example sound energy dispersion over area compared to distance from the sound source. As shown in FIG. 19, sound energy is spread over a larger area the further the area is from the source of the sound. Spreading the energy over a larger area reduces the intensity of the energy. Stated differently, the further the distance from the source of a sound, the lower the sound pressure level. Therefore, adding distance between a user of an electronic device and the source (e.g., fan) of a sound (e.g., fan noise), reduces the sound experienced by the user. In examples disclosed herein, the hinge gasket 1602 is a sound insulation structure that is added in the area of the hinge 1610. The hinge gasket 1602 blocks the sound from the fans from traveling via the hinge 1610 directly to the user. Instead, the user hears sound waves that have traveled laterally around the sides of the second panel 1608. The hinge gasket 1602 changes the sound transmission path of the fan noise and effectively extends the distance between sound source and user. The extended distance reduces the fan noise the user experiences.

Figures 20A, 20B:
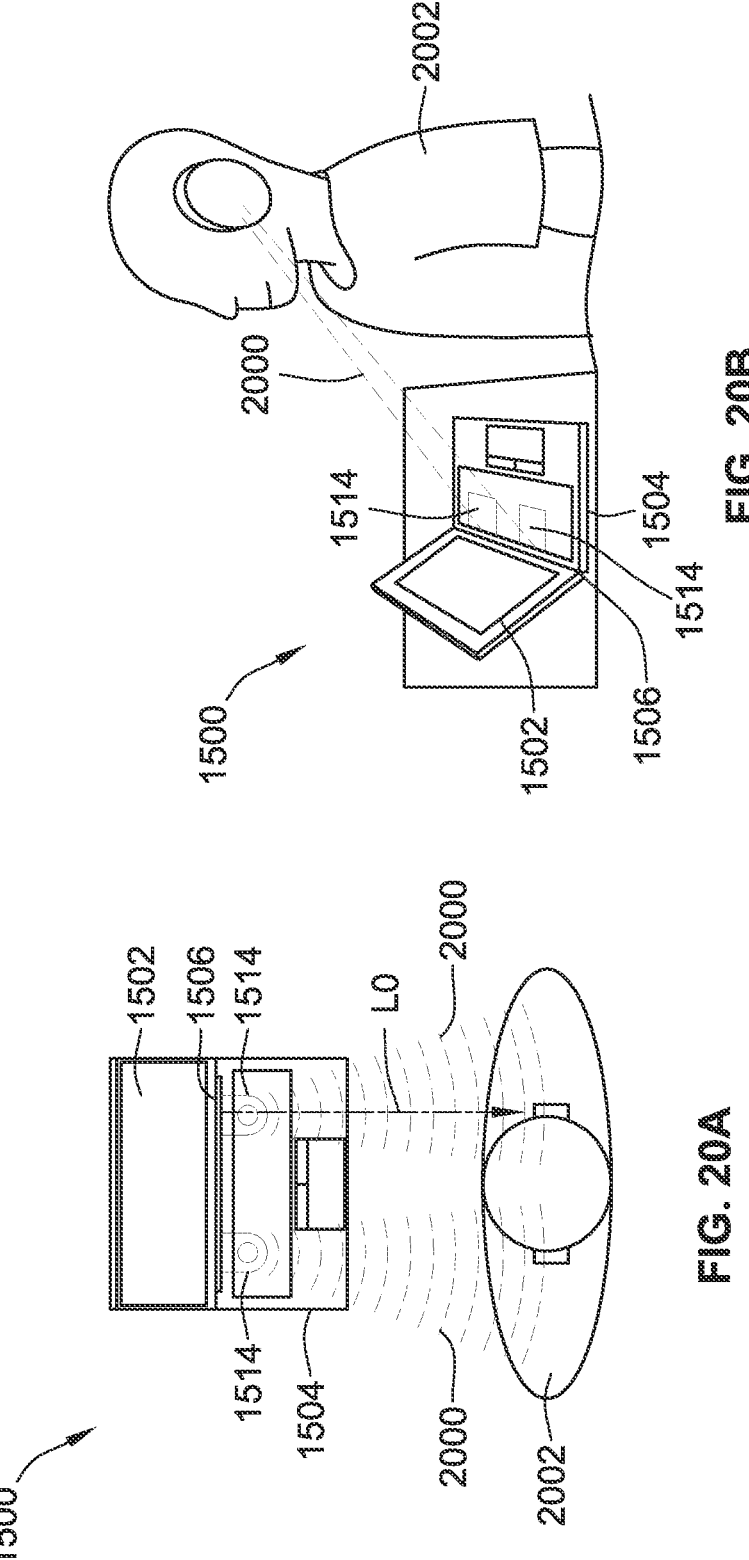
FIG. 20A is a top view schematic illustration of a sound dispersion of an electronic device without the example alternative hinge gasket.
FIG. 20B is a side view schematic illustration of the sound dispersion of the electronic device of FIG. 20A.

FIG. 20A is a top view schematic illustration of a sound dispersion of the electronic device 1500 without the hinge gasket 1602. FIG. 20B is a side view schematic illustration of the sound dispersion of the electronic device 1500 of FIG. 20A. Sound waves 2000 from the noise of the fans 1514 flow via the space around the hinge 1506 between the first panel 1502 and the second panel 1504 directly to the user 2002. The sound waves 2000 travel a distance $L_0$ directly to the user 2002. At the user 2002, the sound waves 2000 have a pressure of $SP_{L0}$.

Figures 21A, 21B:
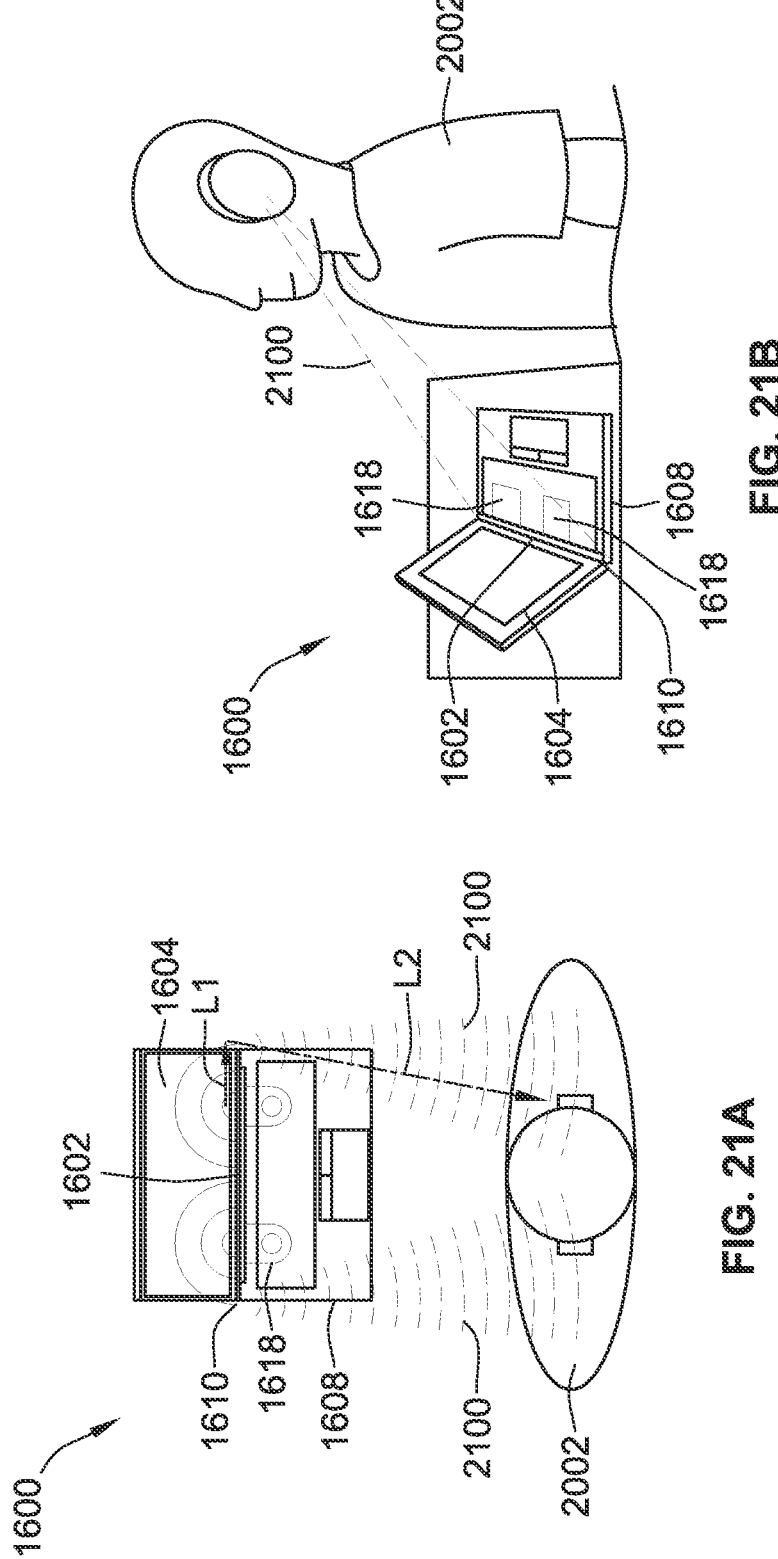
FIG. 21A is a top view schematic illustration of a sound dispersion of an electronic device with the example alternative hinge gasket.
FIG. 21B is a side view schematic illustration of the sound dispersion of the electronic device of FIG. 21A.

FIG. 21A is a top view schematic illustration of a sound dispersion of the electronic device 1600 with the hinge gasket 1602. FIG. 21B is a side view schematic illustration of the sound dispersion of the electronic device 1600 of FIG. 21A. Sound waves 2200 from the noise of the fans 1618 are blocked by the hinge gasket 1602 and cannot flow via the space around the hinge 1610 between the first panel 1604 and the second panel 1608 directly to the user 2002. Instead, the sound waves 2100 travel laterally a distance $L_1$ from the fans 1618 to respective sides of the second panel 1608. The sound waves 2100 then also travel a distance $L_2$ from the sides of the second panel 1608 to the user 2002. Thus, the sound waves 2100 travel a total distance of $L_1+L_2$. The distance $L_1+L_2$ is greater than the distance $L_0$.

At the user 2002, the sound waves 2100 have a pressure of $SP_{L1}$. Because the sound waves 2100 traveled further to reach the user 2002 because of the hinge gasket 1602, the pressure $SP_{L1}$ is less than the pressure $SP_{L0}$. Thus, the user 2002 hears less fan noise when the electronic device 1600 includes the hinge gasket 1602. The hinge gasket 1602 acts as a breakwater to reduce the intensity of the sound waves 2100 by time the sound waves 2100 reach the user 2002. In some examples, the sounds waves 2100 are two or three decibels lower than the sounds wave 2000 with the fans 1514 and the fans 1618 operating at the same fan speed. Table 1 illustrates an example comparison of the electronic device 1500 without the hinge gasket 1602 and the electronic device 1600 with the hinge gasket 1602.

TABLE 1

| Device | Fan Speed | Sound Pressure Level |
|---|---|---|
| Electronic device 1500 | First Fan 1514: 4400 rpm Second Fan 1514: 4200 rpm | 31.9 dBA |
| Electronic device 1600 | First Fan 1618: 4400 rpm Second Fan 1618: 4200 rpm | 29.2 dBA |

As shown in Table 1, the sound waves 2100 are 2.7 dBA less than the sounds wave 2000 with the fans 1514 and the fans 1618 operating at the same (corresponding) fan speeds. Also, in some examples, the hinge gasket 1602 weakens high-frequency sound, which improve sound quality such as, for example, sharpness.

The hinge gasket 1602 also has impact on the thermal capacity of the electronic device 1600. The airflow through the electronic device 1600 includes air intake via the air inlet (e.g., intake vents 300), to the fans 1618, over the fins 1622, through air outlet (e.g., outlet vents 706), and to the ambient environment. In this example, the fins 1622 provide the most resistance or gating to the airflow. The addition of the hinge gasket 1602 does not compromise the thermal capacity of the electronic device. In some examples, the hinge gasket 1602 causes a reduction in the skin temperature on the C cover 1612 and on the first panel 1604. Thus, in some examples, the hinge gasket 1602 acts as a thermal insulator.

In some examples, inclusion of the hinge gasket 1602 in the electronic device 1600 also lowers the operating junction temperature (TJ) of the electronic device 1600. Also, because the sound pressure level is reduced with the use of the hinge gasket 1602, the thermal capacity (Q) increases when the electronic device 1600 operated at the same sound pressure level. For example, the fans 1618 can operate at a higher speed to produce the same sound pressure level as the fans 1514. The increased fan speed increases the thermal capacity of the electronic device 1600. Table 2 illustrates an example comparison of the electronic device 1500 without the hinge gasket 1602 and the electronic device 1600 with the hinge gasket 1602.

TABLE 2

| Device | Fan Speed | Sound Pressure Level | System Q |
|---|---|---|---|
| Electronic device 1500 | First Fan 1514: 4400 rpm Second Fan 1514: 4200 rpm | 31.9 dBA | 2.58 ft³/min |
| Electronic device 1600 | First Fan 1618: 4400 rpm Second Fan 1618: 4200 rpm | 29.2 dBA | 2.58 ft³/min |

TABLE 2-continued

| Device | Fan Speed | Sound Pressure Level | System Q |
|---|---|---|---|
| Electronic device 1600 | First Fan 1618: 4800 rpm Second Fan 1618: 4600 rpm | 31.8 dBA | 2.90 ft³/min |

As shown in the example of Table 2, when the electronic device 1600 operates at higher fan speeds, the system thermal capacity of the electronic device 1600 is 2.90 ft³/min. When the electronic device 1500 operates to produce the same sound pressure level (e.g., ~31.9 dBA) as the electronic device 1600 operating at the higher fan speeds, the system thermal capacity of the electronic device 1500 is 2.58 ft³/min. Thus, in this example, there is a 12% increase in thermal capacity with the electronic device 1600 using the hinge gasket 1602.

From the foregoing, it will be appreciated that example systems, apparatus, articles of manufacture, and methods have been disclosed that improve thermal and acoustic conditions of electronic devices. Disclosed systems, apparatus, articles of manufacture, and methods are accordingly directed to one or more improvement(s) in the operation of a machine such as a computer or other electronic and/or mechanical device.

The improved systems prevent warm or hot air from being recirculated. Therefore, examples disclosed herein maybe implemented in high performance systems such as, for example, those used in the gaming and/or creator segments without sacrificing thermal design power. Examples disclosed herein also lower skin temperature on the C cover and D cover (e.g., top and bottom of the second panel 504) and across the display (e.g., of the first panel 502). In addition, examples disclosed herein reduce the fan noise experience by the user.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable micropro- cessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

Systems, apparatus, articles of manufacture, and methods are disclosed for deploying feet and/or including hinge gaskets to improve thermal solutions and/or acoustic experience with electronic devices. Example 1 includes an electronic device that includes a first panel; a second panel; a hinge coupling the first panel and the second panel; and a foot coupled to the second panel, the foot movable between a deployed position and a retracted position.

Example 2 includes the electronic device of Example 1, further including: a sensor to detect a position of the first panel; instructions; and programmable circuitry to execute the instructions to cause the foot to be moved between the deployed position and the retracted position based on the position of the first panel.

Example 3 includes the electronic device of either of Examples 1 or 2, wherein the programmable circuitry is to: determine an angle of the first panel relative to the second panel; compare the angle to a threshold angle; and cause the foot to be moved the deployed position when the angle is greater than the threshold angle.

Example 4 includes the electronic device of Example 3, wherein the threshold angle is about 90°.

Example 5 includes the electronic device of any of Examples 2-4, wherein the programmable circuitry is to: determine an angle of the first panel relative to the second panel; compare the angle to a threshold angle; and cause the foot to be moved to the retracted position when the angle is less than the threshold angle.

Example 6 includes the electronic device of any of Examples 1-5, wherein the exhaust vents of the second panel are positioned higher than the hinge to direct air exhausted from the electronic device in an upward direction when the foot is in the deployed position.

Example 7 includes the electronic device of any of Examples 1-6, wherein the foot has an extension, the electronic device further including: an actuator; and a push rod coupled to the actuator, the push rod including an engagement end, wherein the actuator is to extend the push rod to cause the engagement end to engage the extension of the foot to move the foot into the retracted position.

Example 8 includes the electronic device of Example 7, wherein the actuator is to retract the push rod to cause the engagement end to at least partially disengage the extension of the foot to move the foot to the deployed position.

Example 9 includes the electronic device of either of Examples 7 or 8, wherein the actuator includes a motor.

Example 10 includes the electronic device of any of Examples 7-9, wherein the actuator is a first actuator, the electronic device including a second actuator, the first actuator and the second actuator laterally displaced along a length of the foot.

Example 11 includes the electronic device of Example 1 further including: a backplate in the second panel; and a biasing member coupled between the backplate and the foot, the biasing member to extend to move the foot into the deployed position, and the biasing member to compress when the foot is moved to the retracted position.

Example 12 includes the electronic device of Example 11, wherein the foot has an extension, the electronic device further including: an actuator; and a push rod coupled to the actuator, the push rod including an engagement end, wherein the actuator is to extend the push rod to cause the engagement end to engage the extension of the foot to move the foot into the retracted position and compress the biasing member, and the actuator is to retract the push rod to cause the engagement end to at least partially disengage the extension of the foot to release the biasing member, which moves the foot to the deployed position.

Example 13 includes the electronic device of any of Examples 1-12, further a hinge gasket coupled to the first panel or the second panel, the hinge gasket to fill a gap between the first panel and the second panel when the electronic device is in an open position.

Example 14 includes the electronic device of Example 13, wherein the hinge gasket is positioned under exhaust vents of the second panel to direct air exhausted from the electronic device in an upward direction.

Example 15 includes the electronic device of either of Examples 13 or 14, wherein the hinge gasket coupled to a bezel around the first panel.

Example 16 includes the electronic device of any of Examples 1-12, further including a hinge gasket coupled to the first panel and spaced from the second panel when the electronic device is closed or opened less than about 120°, the hinge gasket coupled to the first panel and the second panel when the electronic device is opened more than about 120°.

Example 17 includes the electronic device of any of Examples 1-13, further including a hinge gasket coupled between the second panel and the hinge, the hinge gasket to direct fan noise from the electronic device laterally.

Example 18 includes the electronic device of Example 17, wherein the hinge gasket absorbs fan noise.

Example 19 includes the electronic device of either of Examples 17 or 18, wherein the hinge gasket is a thermal insulator.

Example 20 includes a non-transitory machine readable storage medium that includes instructions to cause programmable circuitry to at least: determine an angle of a first panel of an electronic device relative to a second panel of the electronic device; compare the angle to a threshold angle; cause a foot coupled to the second panel of the electronic device to be moved to a retracted position when the angle is less than the threshold angle; and cause the foot to be moved to a deployed position when the angle is greater than the threshold angle.

Example 21 includes the storage medium of Example 20, wherein the programmable circuitry is to cause the foot to move between the retracted position and the deployed position by adjusting a supply of electricity to a motor coupled to the foot.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An electronic device comprising:
a first panel;
a second panel;
a hinge coupling the first panel and the second panel;
a foot coupled to the second panel, the foot movable between a deployed position and a retracted position, the foot including an extension;
an actuator;
a push rod coupled to the actuator, the push rod including an engagement end;
a sensor to detect a position of the first panel;
instructions; and
at least one programmable circuit to be programmed by the instructions to:
activate the actuator to extend the push rod to cause the engagement end of the push rod to engage the extension of the foot, the extension of the foot to slide along the engagement end of the push rod based on activation of the actuator; and
cause the foot to be moved between the deployed position and the retracted position as the extension of the foot slides along the engagement end of the push rod and based on the position of the first panel.

2. The electronic device of claim 1, wherein the programmable circuitry is to:
determine an angle of the first panel relative to the second panel;
compare the angle to a threshold angle; and
cause the foot to be moved the deployed position when the angle is greater than the threshold angle.

3. The electronic device of claim 2, wherein the threshold angle is about 90°.

4. The electronic device of claim 1, wherein one or more of the at least one programmable circuit is to:
determine an angle of the first panel relative to the second panel;
compare the angle to a threshold angle; and
cause the foot to be moved to the retracted position when the angle is less than the threshold angle.

5. The electronic device of claim 1, wherein the exhaust vents of the second panel are higher than the hinge to direct air exhausted from the electronic device in an upward direction when the foot is in the deployed position.

6. The electronic device of claim 1, wherein the engagement end includes an inclined surface and
the extension of the foot is to slide up the inclined surface to move the foot into the retracted position.

7. The electronic device of claim 6, wherein the actuator is to retract the push rod to cause the extension of the foot to slide down the inclined surface of the engagement end to move the foot to the deployed position.

8. The electronic device of claim 6, wherein the actuator includes a motor.

9. The electronic device of claim 6, wherein the actuator is a first actuator, the electronic device including a second actuator, the first actuator and the second actuator laterally displaced along a length of the foot.

10. The electronic device of claim 1 including:
a backplate in the second panel; and
a biasing member coupled between the backplate and the foot, the biasing member to extend to move the foot into the deployed position, and the biasing member to compress when the foot is moved to the retracted position.

11. The electronic device of claim 10, wherein
compress the biasing member, and the actuator is to retract the push rod to cause the engagement end to at least partially disengage the extension of the foot to release the biasing member, which moves the foot to the deployed position.

12. The electronic device of claim 1, including a hinge gasket coupled to the first panel or the second panel, the hinge gasket to fill a gap between the first panel and the second panel when the electronic device is in an open position.

13. The electronic device of claim 12, wherein the hinge gasket is under exhaust vents of the second panel to direct air exhausted from the electronic device in an upward direction.

14. The electronic device of claim 12, wherein the hinge gasket coupled to a bezel around the first panel.

15. The electronic device of claim 1, including a hinge gasket coupled to the first panel and spaced from the second panel when the electronic device is closed or opened less than about 120°, the hinge gasket coupled to the first panel and the second panel when the electronic device is opened more than about 120°.

16. The electronic device of claim 1, further including a hinge gasket coupled between the second panel and the hinge, the hinge gasket to direct fan noise from the electronic device laterally.

17. The electronic device of claim 16, wherein the hinge gasket absorbs fan noise.

18. The electronic device of claim 16, wherein the hinge gasket is a thermal insulator.

19. A non-transitory machine readable storage medium comprising instructions to cause at least one programmable circuit circuitry to at least:
determine an angle of a first panel of an electronic device relative to a second panel of the electronic device, the first panel and second panel coupled by a hinge;
compare the angle to a threshold angle;
cause a foot coupled to the second panel of the electronic device to be moved to a retracted position when the angle is less than the threshold angle by extending a push rod toward the hinge; and cause the foot to be moved to a deployed position when the angle is greater than the threshold angle by retracting the push rod away from the hinge.

20. The storage medium of claim 19, wherein one or more of the at least one programmable circuit is to cause the foot to move between the retracted position and the deployed position by adjusting a supply of electricity to a motor operably coupled to the foot via the push rod.

\* \* \* \* \*